(12) United States Patent
Lewis et al.

(10) Patent No.: US 6,354,540 B1
(45) Date of Patent: Mar. 12, 2002

(54) ANDROGYNOUS, RECONFIGURABLE CLOSED LOOP FEEDBACK CONTROLLED LOW IMPACT DOCKING SYSTEM WITH LOAD SENSING ELECTROMAGNETIC CAPTURE RING

(75) Inventors: James L. Lewis, Houston; Monty B. Carroll, League City; Ray H. Morales, Houston; Thang D. Le, Friendswood, all of TX (US)

(73) Assignee: The United States of America as represented by the Administrator of the National Aeronautics and Space Administration, Washington, WA (US)

( * ) Notice: Subject to any disclaimer, the term of this patent is extended or adjusted under 35 U.S.C. 154(b) by 0 days.

(21) Appl. No.: 09/405,301

(22) Filed: Sep. 20, 1999

Related U.S. Application Data

(60) Provisional application No. 60/104,843, filed on Sep. 29, 1998.

(51) Int. Cl.[7] .................................................. B64G 1/64
(52) U.S. Cl. ..................................................... 244/161
(58) Field of Search ............................ 244/158 R, 161, 244/159, 135 A, 65.5, 86.4; 403/51; 285/221; 114/249, 250, 230

(56) References Cited

U.S. PATENT DOCUMENTS

| | | | |
|---|---|---|---|
| 3,391,881 A | 7/1968 | Maltby ............................ | 244/1 |
| 3,508,723 A | 4/1970 | Warren et al. ................... | 244/1 |
| 3,526,372 A | 9/1970 | Paine .............................. | 244/1 |
| 3,582,017 A | 6/1971 | Zecca ............................. | 244/1 |
| RE27,903 E | 1/1974 | Fogarty ..................... | 244/1 SD |
| 3,794,270 A | 2/1974 | Wilkens ................... | 244/1 SD |
| 4,381,092 A | 4/1983 | Barker ......................... | 244/161 |
| 4,500,057 A * | 2/1985 | Duwelz ....................... | 244/161 |
| 4,809,936 A * | 3/1989 | Whitaker ..................... | 244/161 |
| 4,858,857 A * | 8/1989 | Lange et al. ................. | 244/161 |
| 4,860,975 A * | 8/1989 | Schliesing et al. .......... | 244/161 |
| 4,921,292 A | 5/1990 | Harwell et al. ............. | 294/65.5 |
| 5,005,786 A | 4/1991 | Okamoto et al. ........... | 244/161 |
| 5,040,748 A | 8/1991 | Torre et al. ............. | 244/158 R |
| 5,040,749 A * | 8/1991 | Johnson ....................... | 244/161 |
| 5,104,070 A * | 4/1992 | Johnson et al. ............. | 244/161 |
| 5,125,601 A * | 6/1992 | Monford, Jr. ............... | 244/161 |
| 5,145,227 A | 9/1992 | Monford, Jr. ............. | 244/65.5 |
| 5,253,944 A * | 10/1993 | Preston ........................ | 244/161 |
| 5,364,046 A | 11/1994 | Dobbs et al. ............... | 244/161 |
| 5,449,211 A | 9/1995 | Monford, Jr. .............. | 294/65.5 |

* cited by examiner

Primary Examiner—Galen L. Barefoot
(74) Attorney, Agent, or Firm—Hardie R. Barr

(57) ABSTRACT

The present invention relates to a fully androgynous, reconfigurable closed loop feedback controlled low impact docking system with load sensing electromagnetic capture ring. The docking system of the present invention preferably comprises two docking assemblies, each docking assembly comprising a load sensing ring having an outer face, one of more electromagnets, one or more load cells coupled to said load sensing ring. The docking assembly further comprises a plurality of actuator arms coupled to said load sensing ring and capable of dynamically adjusting the orientation of said load sensing ring and a reconfigurable closed loop control system capable of analyzing signals originating from said plurality of load cells and of outputting real time control for each of the actuators. The docking assembly of the present invention incorporates an active load sensing system to automatically dynamically adjust the load sensing ring during capture instead of requiring significant force to push and realign the ring.

22 Claims, 15 Drawing Sheets

ANDROGYNOUS, RECONFIGURABLE CLOSED LOOP FEEDBACK CONTROLLED LOW IMPACT DOCKING SYSTEM WITH LOAD SENSING ELECTROMAGNETIC CAPTURE RING

This application claim benefit to provisional application No. 60/104,843 Sep. 29, 1998.

BACKGROUND OF THE INVENTION

1. Field of the Invention

The present invention generally relates an androgynous, reconfigurable closed loop feedback controlled low impact docking system and assembly with load sensing electromagnetic capture ring. More particularly, the invention relates to a load sensing, electromagnetic docking system. Still more particularly, the invention relates to a docking assembly and system having a reconfigurable control system that permits a load sensing ring with an electromagnetic capture mechanism to "softly" capture and dock two structures or vehicles together.

2. Background of the Invention

Docking systems permit two structures or vehicles to be coupled together. For instance, the assignee of the present invention uses docking systems to dock one spacecraft to another in orbit around the Earth. The International Space Station (ISS) currently under construction in space has a docking system to permit the Space Transport System (STS), also referred to as the "Shuttle", to dock to the ISS. Crew, equipment, supplies, and other types of cargo then can be transferred from one vehicle to the other through the docking system tunnel.

Most docking systems use a mechanical structure comprising latches, hooks and other mechanisms. Generally, there are two different ways of coupling vehicles together, either docking or berthing. "Docking" occurs when a free-flying vehicle, such as the Space Shuttle, under its own control maneuvers into the capture envelope and then into contact with the docking assembly of another vehicle, such as the Space Station. "Berthing" occurs when an externally attached device such as a Remote Manipulator System (RMS), that is structurally grounded to one vehicle such as the Space Station, attaches to the other vehicle and maneuvers into the capture envelope and then into contact with the Space Station docking assembly. Docking or berthing two vehicles requires that each vehicle have a docking assembly. To dock two vehicles using a conventional mechanical docking assembly, the vehicles must be pressed together with sufficient force to re-align the soft capture ring and to trip the mechanical soft capture latches, hooks, or etc. on the respective docking assemblies, thereby coupling the two docking assemblies. In a terrestrial application, this action is analogous to two train cars coupling. Train cars can be coupled only if one car is pushed against the other car with enough force to open and then close the mechanical coupling assembly.

The following discussion details the primary phases in any docking scenario. First is the "approach" phase wherein a vehicle moves into a capture envelope. A capture envelope is a predetermined area surrounding a docking assembly into which a pilot or remote control must guide a vehicle before docking/berthing can be effected. Second is the "alignment" phase wherein the two vehicles to be docked establish a soft capture ring alignment with one another. This phase has traditionally been accomplished by driving vehicles together to force capture ring alignment using passive guides during docking or by realigning using RMS visual cues to correct for misalignments. Third is the "capture" phase which is accomplished by forcing capture latches to hold the vehicles together or by "reach around and grab arms" to capture the mating interface during berthing. Fourth is the "attenuation" phase, wherein the dynamic energy and residual motion of the separate vehicles is absorbed by the combined assembly. Fifth is the "retraction" phase where residual misalignments are nullified and the docking mechanism is retracted to bring the mating sealing interfaces in contact. The final phase is the "structural mating" phase. There, structural latches are engaged to provide a rigid structural interface and to compress and pre-load the seals to facilitate the maintenance of a pressurized volume.

With prior mechanical docking assemblies, the action of forcing two vehicles together, particularly in space, can result in damage to one or both of the vehicles or sensitive systems and components due to the high forces required to actuate capture mechanisms when docking. Further, forcing the vehicles together can ruin vibration sensitive experiments, such as crystal growth experiments, that may be performed on one or both of the vehicles. Thus, there is a need for a docking system that can minimize or eliminate the potential for structural damage and vibration caused by conventional docking systems.

Despite the advantages a docking system would provide, to date no such docking system is known to exist that provides low force mating or that can accomplish both docking and berthing operations.

BRIEF SUMMARY OF THE INVENTION

The problems noted above are solved in large part by the androgynous, reconfigurable closed loop feedback controlled low impact docking system with load sensing electromagnetic capture ring of the present invention. In one embodiment, the docking system comprises two fully androgynous docking assemblies. This allows two identical docking assemblies to dock or berth with one another in contrast to docking systems that use different (male and female) assemblies. Each docking assembly comprises a load sensing ring having an outer face, one or more electromagnets positioned on the outer face of the load sensing ring, and striker plates positioned on the outer face of the load sensing ring. Each docking assembly further comprises a plurality of load cells coupled to the load sensing ring, a plurality of actuator arms coupled to the load sensing ring capable of dynamically adjusting the position and orientation of the load sensing ring, and a reconfigurable closed loop control system capable of analyzing signals originating from the load cells and of outputting real time control for the actuator arms.

To a certain extent, the docking system of the present invention is somewhat analogous to the Russian built Androgynous Peripheral Assembly System (APAS). The docking system disclosed herein differs, however, from the APAS in that the present invention is a "smart" electromechanical system comprised of a blend of structural/mechanical, electrical, computer controlled, and software elements. Further, "androgynous" as that term is used in the Russian APAS system means that only parts of the assembly interfaces are androgynous, whereas the present invention is fully androgynous. Being fully androgynous allows an active docking assembly to mate with another active docking assembly; two active APAS systems cannot mate.

In addition, the design of the present invention varies from the traditional docking mechanism of a highly mechanically interconnected system of gears, clutches, and linkages. The present invention comprises a reconfigurable computer controlled mechanism and uses a smart electromechanical, six (6) degrees of freedom platform that incorporates an active load sensing system to automatically and dynamically adjust the soft capture ring during capture, instead of requiring significant force to push and realign the ring. Instead of mechanical trip latches that require a tripping force for capture, the present invention uses electromagnets to achieve "soft" capture, but not limited to. Further, the present invention also can be controlled as a damper in lieu of the interconnected linear actuators and the separate load attenuation system associated with conventional docking systems, which are used to attenuate the residual motion and dissipate the forces resulting from ramming two vehicles together.

Moreover, the docking assembly of the present invention does not require minimum or maximum closing velocities or dynamic forces for correcting misalignments and effective capture. In fact, the docking system of the present invention can handle large positive closing velocities and forces, as well as negative and zero closing velocities. Further, the reconfigurable closed loop control system is adjustable to match a specific vehicle's properties i.e. mass and center of mass or gravity offset and operational mating characteristics, i.e., approach velocities and angular rates. The control system parameters are tunable in each axis to various stiffness and damping constants depending upon stiffness, capture, and mass handling response requirements. This results in a large range of vehicle applicability and mating capabilities.

BRIEF DESCRIPTION OF THE DRAWINGS

For a detailed description of the preferred embodiments of the present invention, reference will now be made to the accompanying drawings in which.

NOTATION AND NOMENCLATURE

Certain terms are used throughout the following description and claims to refer to particular system components. As one skilled in the art will appreciate, different writers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either an indirect or direct connection. Thus, if a first device couples to a second device, that connection may be through a direct connection, or through an indirect connection via other devices and connections. The term "connect" or "connected" is intended to mean a direct connection.

DETAILED DESCRIPTION OF THE PREFERRED EMBODIMENTS

Figure 1:
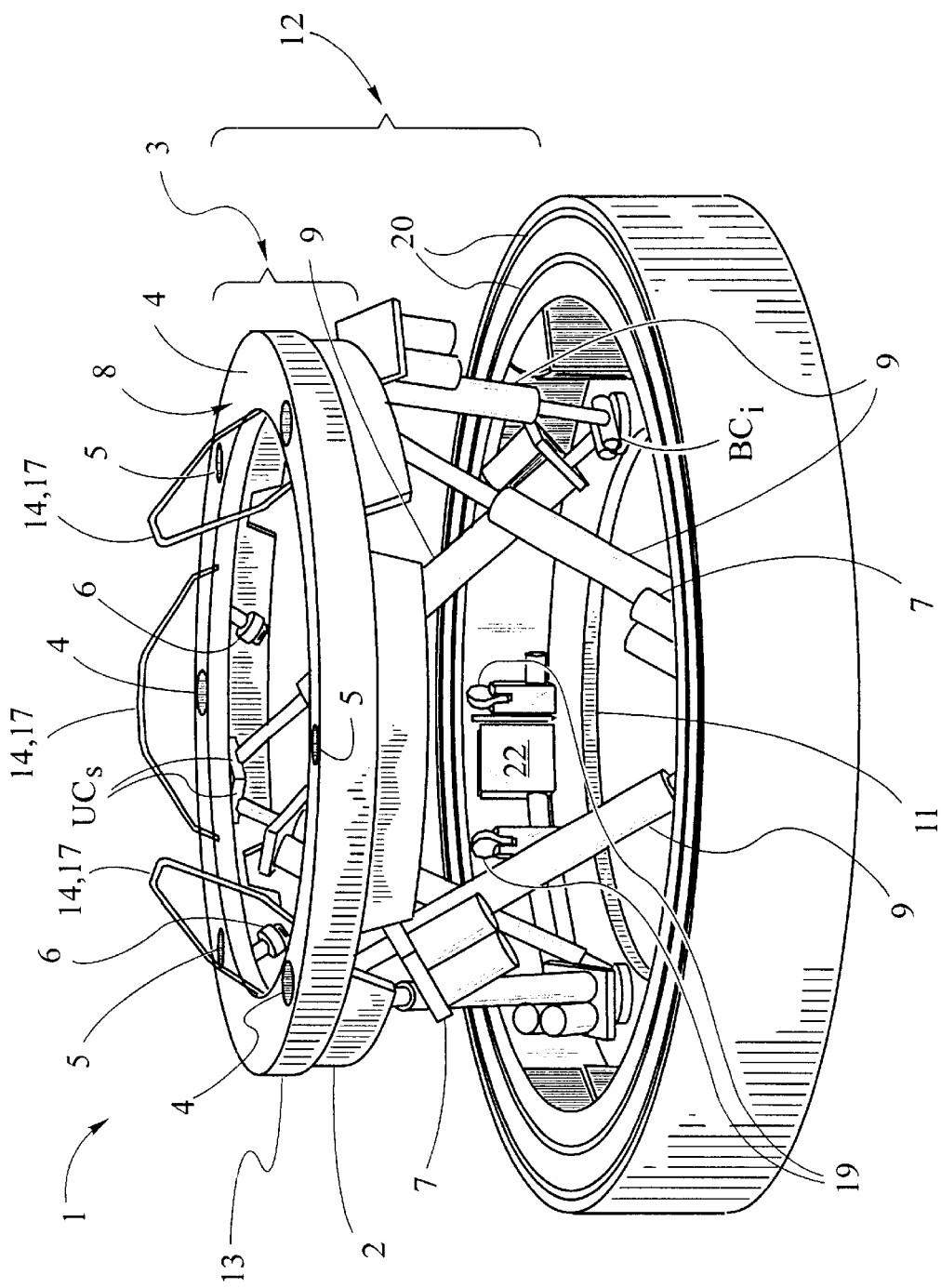
FIG. 1 is a perspective view of the docking assembly of the preferred embodiment in the extended position
Figure 3:
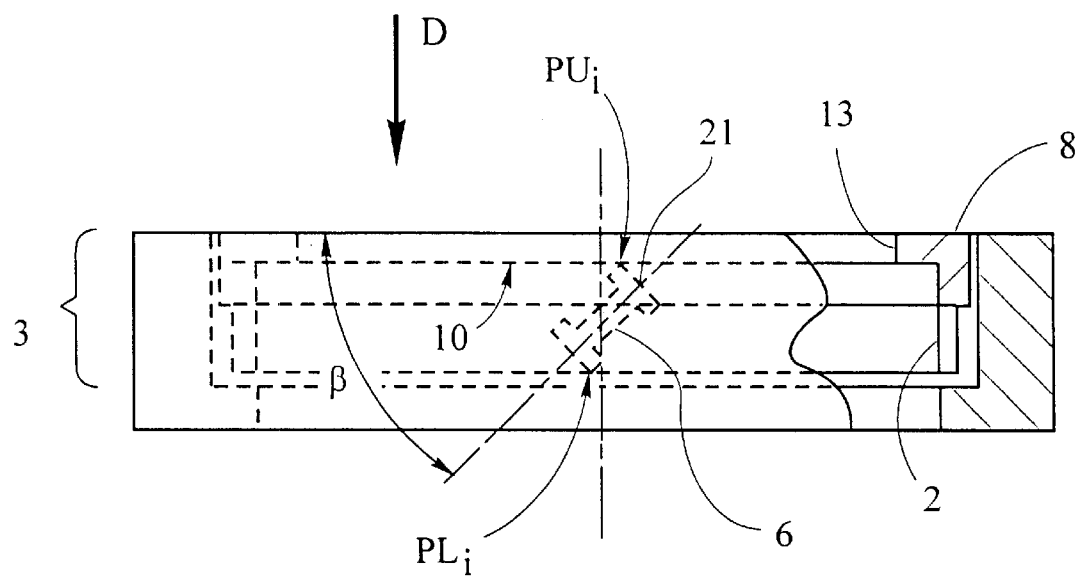
FIG. 3 is a side view of the load sensing ring of the docking assembly of the preferred embodiment.

FIG. 1 is a perspective view of a docking assembly 1 in accordance with the preferred embodiment of the invention. Docking assembly 1 preferably comprises a load sensing ring 3, one or more electromagnets 4, one or more striker plates 5, a plurality of load cells 6, a plurality of actuators 9, a plurality of alignment guides 14, and an active closed loop control system 15 (not shown). Load sensing ring 3 has an annular outer face 8 and an inner face 10 (FIG. 3). The electromagnets 4 and striker plates 5 preferably are positioned on outer face 8. Each of the alignment guides 14 is also positioned on outer face 8. In the preferred embodiment shown in FIG. 1, each of the alignment guides 14 is a foldable guide petal 17.

Figure 2:
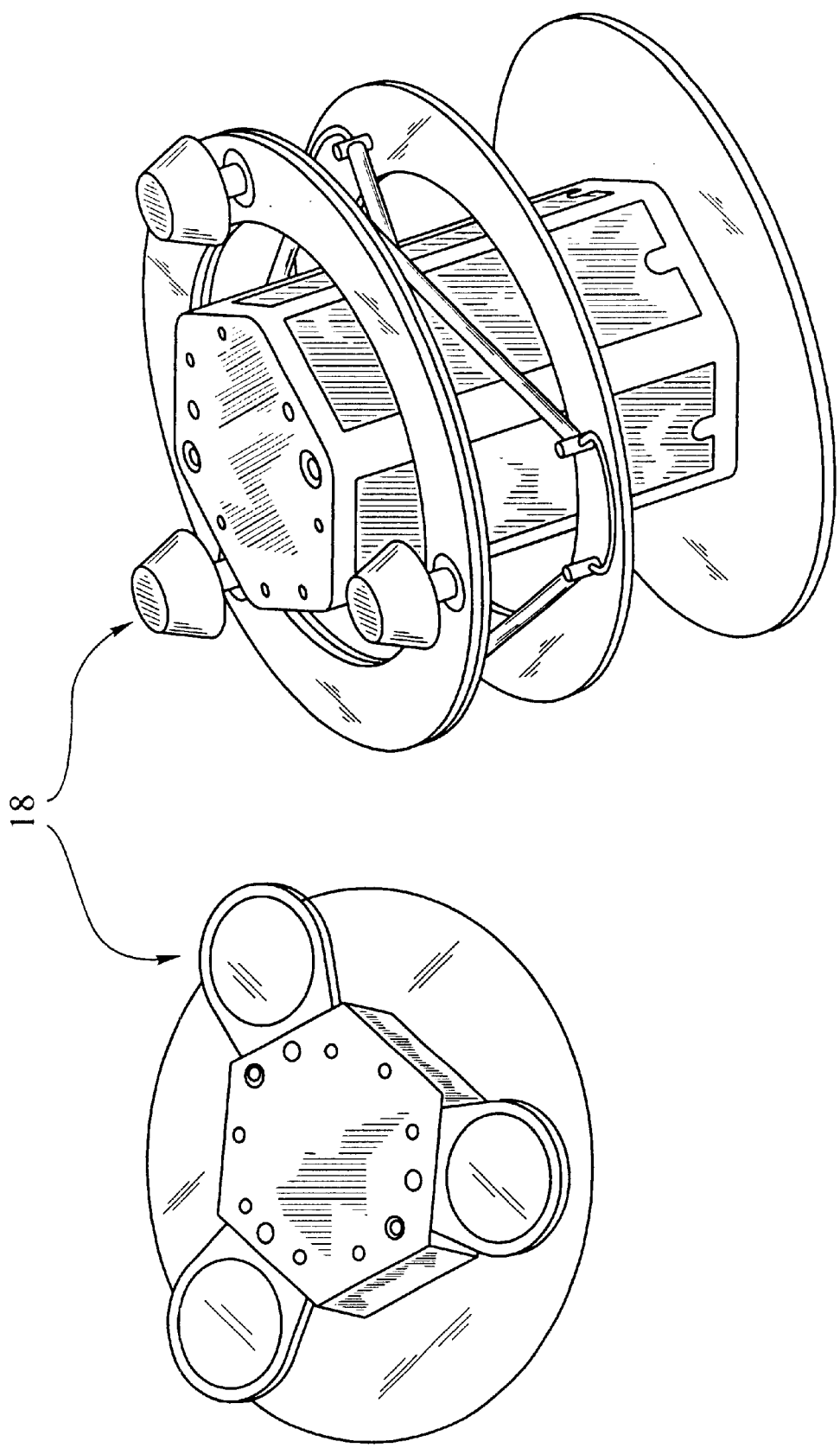
FIG. 2 is an alternative embodiment of the alignment guides of the docking assembly.

The docking assembly 1 can use other structures as an alternative to petals 17. For example, probe and cone guides 18 shown in FIG. 2 can be used in place of petals 17.

Referring again to FIG. 1, load sensing ring 3 preferably comprises a soft capture ring 13 and a structural ring 2. The soft capture ring 13 and structural ring 2 are attached or otherwise coupled together using load cells 6. Load sensing ring 3 is an active load sensing ring, meaning that load sensing ring 3 uses load cells 6 to actively sense any forces applied to load sensing ring 3, such as the forces the load sensing ring 3 experiences during docking or berthing.

One or more motors 7 control each of the actuators 9. Each motor 7 is mechanically coupled to its respective actuator 9. Each motor 7 is capable of physically lengthening and shortening its actuator 9 to dynamically adjust the position and orientation of load sensing ring 3. Where the term "dynamically" includes such physical lengthening and shortening of actuators in real time. Because soft capture ring 13 and structural ring 2 are coupled by the load cells 6, dynamically adjusting the position and orientation of load sensing ring 3 dynamically adjusts the position and orientation of soft capture ring 13. Controller 16 (not shown) is coupled to the motors 7 and to closed loop control system 15. Closed loop control system 15 and controller 16 are housed within compartment 22.

In the preferred embodiment of docking assembly 1, the closed loop control system 15 is reconfigurable, i.e., is adjustable to a specific vehicle's properties i.e. mass and center of gravity offset and operational mating characteristics, i.e., approach velocities and angular rates. Further, closed loop control system 15 parameters are tunable in each axis to various stiffness and damping constants depending upon stiffness, capture, and mass handling response requirements. This results in a large range of vehicle applicability and mating scenarios.

As described in detail below, closed loop control system 15 receives signals from the load cells 6. These signals correspond to, or are representative of, the forces $F_i$ sensed by each of the six load cells 6 (where "i" is the number of one of the six load cells 6). Closed loop control system 15 processes those force signals and transmits to controller 16 a processed signal representing the length $L_s$ (where "s" is the number of one of the six actuators 9) to which each of the actuators 9 must move to counteract, absorb, or attenuate each force $F_i$. Based on the required length $L_s$, controller 16 directs the motors 7 to physically and dynamically adjust each of the corresponding actuators 9 to its calculated $L_s$. In general, the docking system 1 continuously monitors the forces $F_i$ sensed by the load cells 6 and directs each actuator 9 to adjust its length to a calculated length $L_s$ to counteract, absorb, or attenuate the forces.

In the preferred embodiment, for conservation of space and weight, a single controller 16 controls all of the motors 7. Alternatively, two or more controllers 16 can be included without sacrificing the benefits of the present invention. If multiple controllers 16 are included, one of the controllers 16 actively controls the motors 7, while the other controller (s) 16 are redundant and remain ready to be used if the active controller fails. Referring to FIG. 1, the actuators 9, controller 16, motors 7, structural ring 2, and platform base ring 11 comprise a six degree of freedom platform 12. By "six degrees of freedom" it is meant that platform 12 is capable of translational motion along x, y, and z axes and rotational motion about x, y, and z axes (called roll, pitch and yaw, respectively).

Each of the actuators 9 preferably comprises a standard linear actuator with a ball screw and thrust tube and has an upper connection point $UC_s$ on load sensing ring 3 and a base connection point $BC_s$, on platform base ring 11 (where "s" represents the number of one of the six actuators 9). As explained in more detail below, six degree of freedom platform 12 dynamically adjusts the soft capture ring 13 so that the residual motion between the two vehicles being docked or berthed is damped and the forces associated with the docking or berthing process are attenuated.

Referring now to FIGS. 1 and 3, each of the load cells 6 is a uni-axial compression/tension force sensor that has a sensing end 21 and a length L. Additionally, each of the load cells 6 is coupled to load sensing ring 3 at an upper connection point $PU_i$ and a lower connection point $PL_i$ (where "i" represents the number of one of the six load cells 6). The preferred docking assembly 1 comprises six load cells 6, thus i is one of the set; 1, 2, 3, 4, 5, or 6. In FIG. 3, the load cells 6 are positioned between structural ring 2 and soft capture ring 13. The load cells 6 are oriented at an angle 13 relative to outer face 8 of soft capture ring 13. Preferably, angle β equals 45°. Each of the load cells 6 has spherical joints or ball bearing universal joints (not shown) at each axial end to allow purely axial forces $F_i$ to be sensed through each of the load cells 6. As such, each load cell 6 preferably is an uni-axial device that senses force predominately along its longitudinal axis.

Figure 4:
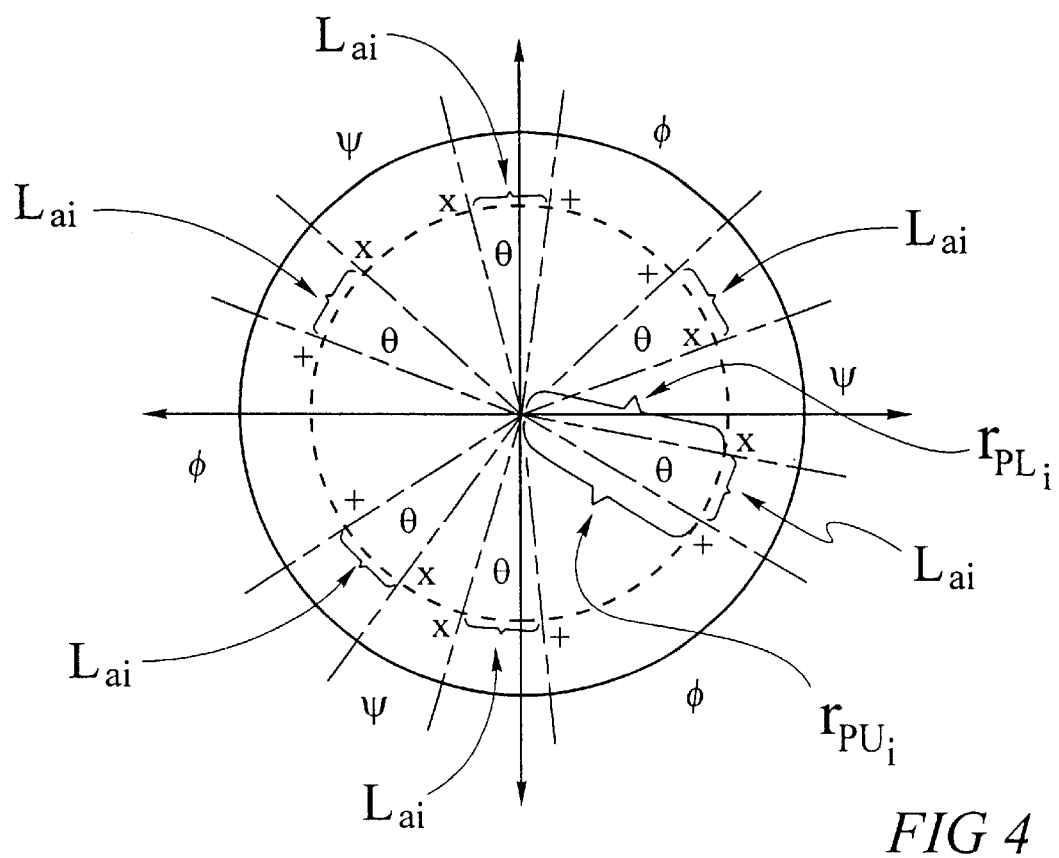
FIG. 4 depicts the projection of the load cells of the docking assembly of the preferred embodiment into an x-y plane.
Figure 6:
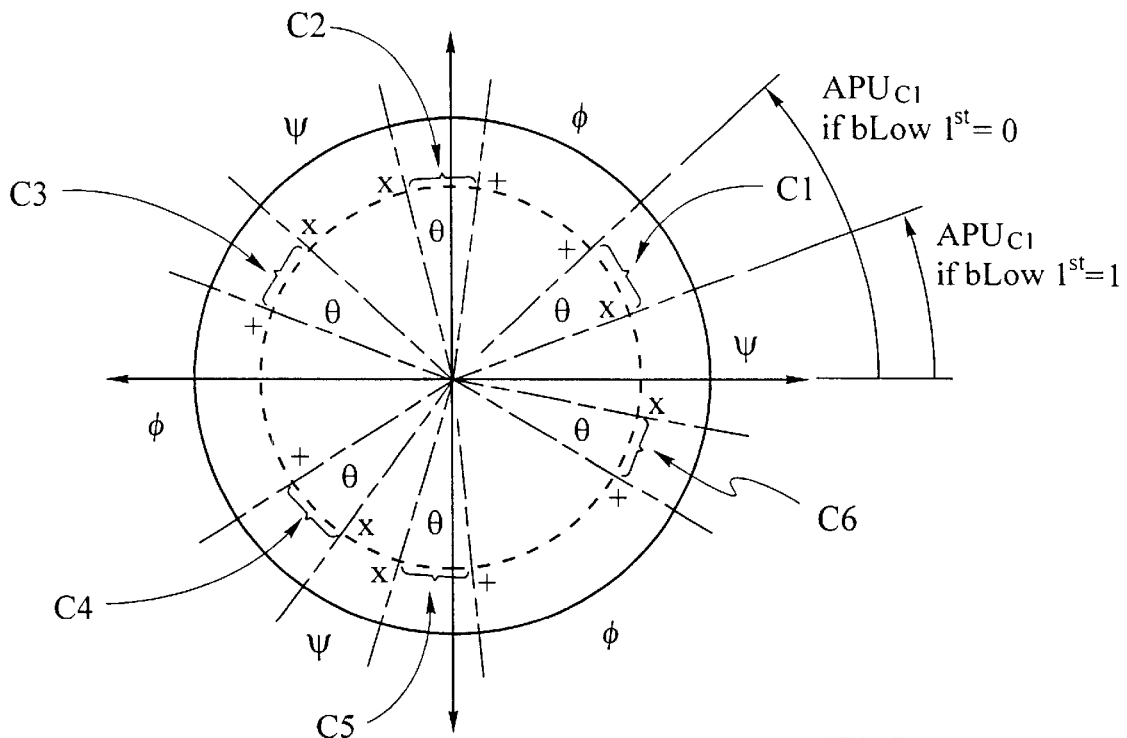
FIG. 6 depicts the angle of each upper and lower connection point of the load cells of the docking assembly of the preferred embodiment in reference to the positive x-axis.
Figure 7:
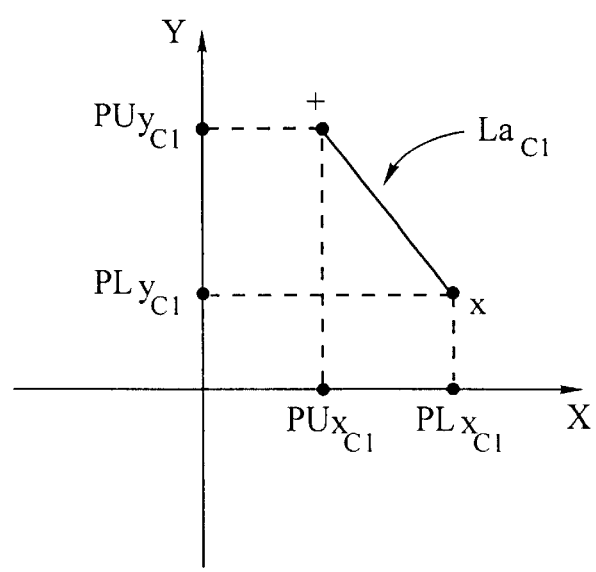
FIG. 7 depicts the x-y coordinates of a load cell of the docking assembly of the preferred embodiment.
Figure 8:
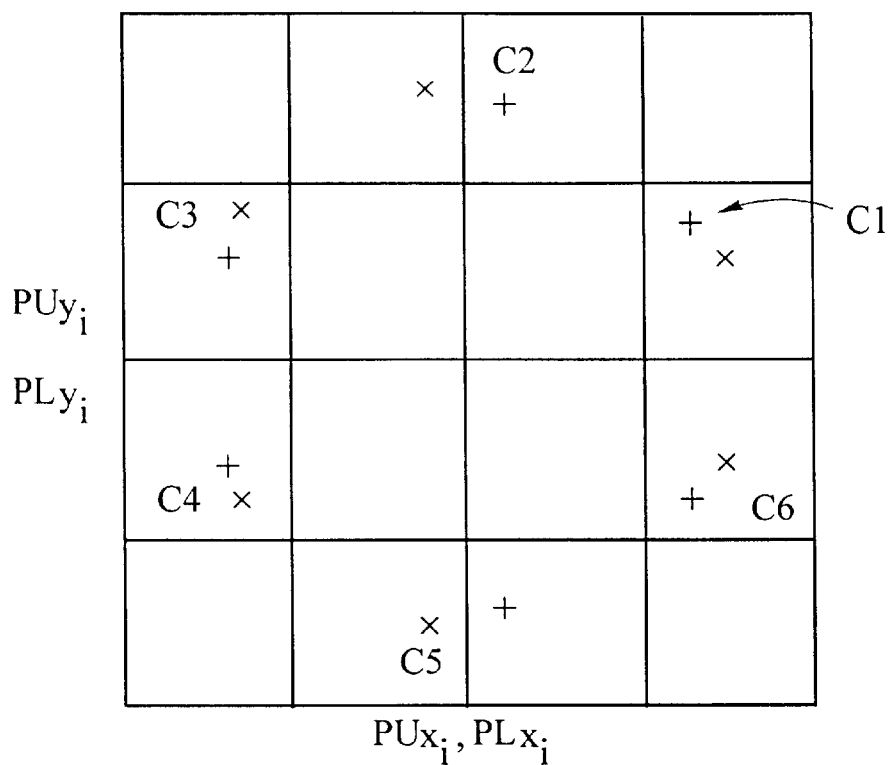
FIG. 8 depicts the x-y coordinates of the upper and lower connection points of a load cell of the docking assembly of the preferred embodiment.

Referring now to FIGS. 4 through 8, the load cells 6 preferably are mounted in a circular arrangement. FIG. 4 is a top view of the length L of load cells 6 (in the direction of Arrow D in FIG. 3) projected into the x-y plane of coordinate system R, shown in FIG. 5. The preferred arrangement is one that minimizes the error (increases the accuracy) of the load computation. The circular arrangement of the load cells 6 can be determined by plotting the upper connection points $PU_i$ and the lower connection points $PL_i$ of the load cells 6 in three dimensions, namely x, y, and z, and projecting the length of the load cell 6 onto the x-y plane, as shown in FIG. 8. Referring to FIGS. 4, 6, 7, and 8, the "x" symbols represent the x-y coordinate of each $PL_i$ and the "+" symbols represent the x-y coordinate of each $PU_i$.

FIG. 7 shows the chord length $L_a$ resulting from the projection of length L for a load cell 6 into plane XY. Chord length La can be written as $L_a = L \cos(\beta)$ (Equation 1).

As an example, the preferred circular arrangement of the load cells 6 can be calculated using the following defined parameters, which are exemplary values used to illustrate the principles of the preferred embodiment:

| | |
|---|---|
| L = 1.76 (inches) | Length L of each load cell 6 |
| $r_{PLi}$ = 15.00 (inches) | Radius of lower connection $PL_i$ of a load cell 6 |
| $r_{PUi}$ = 14.75 (inches) | Radius of upper connection $PU_i$ of a load cell 6 |
| Xoff = 0.0 (inches) | X offset to the x-axis of interest |
| Yoff = 0.0 (inches) | Y offset to the y-axis of interest |
| Zoff = −4.876 (inches) | Z offset to the z-axis of interest |
| β = 45.0 degrees | Angle of inclination of each of the load cells 6 relative to outer face 8, as shown in Figure 3 |
| k = 1.01275223 | Ratio of spacing angles |
| bLow1st = 1 | Boolean value that switches (i.e., acts as if the U and L connection points were reversed) PU and PL of each of the load cells 6, bLow1st (1) has Lower connection first from the X-axis |

Figure 5:
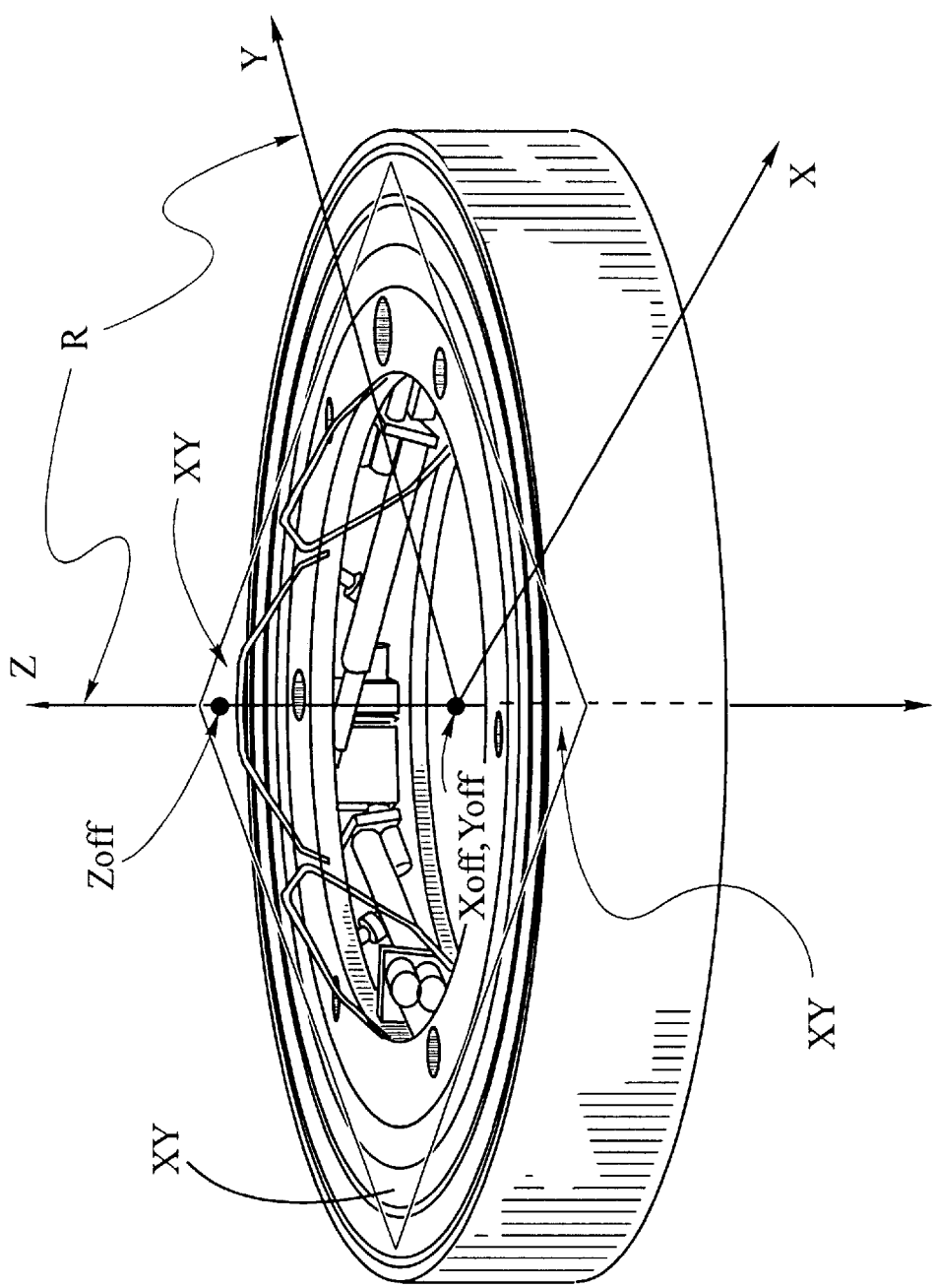
FIG. 5 is a perspective view of the docking assembly of the preferred embodiment in the retracted position.

FIG. 5 shows the preferred x, y, z coordinate system R used in relation to the load cells 6. FIG. 5 also shows plane XY of coordinate system R. To calculate the preferred circular arrangement of the load cells 6, the x and y offsets Xoff, Yoff are 0.0 inches and the z-offset Zoff is −4.876 inches, a position above the x-y plane, as shown in FIG. 5. Zoff is preferably above the x-y plane because the initial contact occurs on or above the outer face 8 on the alignment guides 14. The Zoff center of force rotation is chosen in such a manner to minimize moments generated across the interface at the location of initial contact on the alignment guides 14. This arrangement makes capture more stable. The boolean value bLow1st switches the position of $PU_i$ and $PL_i$ for each of the load cells 6. By changing the boolean bLow1st from 1 to 0 or vice-versa, the x-y position of each $PL_i$ switches to the x-y position of each $PU_i$ while the x-y position of each $PU_i$ switches to the x-y position of each $PL_i$.

Referring to FIG. 7, using the triangle formed from the chord length La and two lines drawn from the center of the circle to the x-y coordinates of $PU_i$ and $PL_i$ of each of the load cells 6, an angle θ is calculated using the Law of Cosines, known to those of ordinary skill in the art.

$$\theta = a\cos\left[\frac{(r_{PLi}^2 + r_{PUi}^2) - La^2}{(2r_{PLi}r_{PUi})}\right] \quad \text{(Equation 2)}$$

Due to symmetry in the arrangement of the load cells 6, the ratio of spacing angles k is defined as: k=ψ/φ (Equation 3). Referring now to FIG. 4, the angle θ formed between the projected length La, the spacing angle Φ between the upper connection point $PU_i$ of each of the load cell 6, and the spacing angle ψ between the lower connection point $PL_i$ of each of the load cells 6 sum to 360 degrees and can be written as follows:

$$6\theta + \phi + 3\psi = 360° \quad \text{(Equation 4)}.$$

Since θ can be calculated using Equation 3, φ can be determined in terms of θ and k:

$$\phi := \frac{(120 \text{ deg} - 2\theta)}{(1+k)}. \quad \text{(Equation 5)}$$

Now referring to FIG. 6, the x-y location of upper and lower connection points $PU_i$, $PL_i$ each of the load cells 6 are calculated from angles measured from the positive x-axis. $APU_i$ is the array of angles (where the subscripts indicate a particular load cell 6 as shown in FIG. 6) representing the angle of each upper connection point $APU_i$, measured from the positive x-axis. Likewise $APL_i$ represents the angles of the lower connection points measured from the positive x-axis. In the preferred embodiment the number i of load cells 6 equals six. Referring still to FIG. 6, as an example of the preferred embodiment, the projection $La_i$ of each load cells 6 is shown, where C1, C2, C3, C4, C5, C6 denotes load cells one through six.

$$APU_{c1} = \frac{\psi}{2} + \text{if } (bLow1st, \theta, 0) \quad \text{(Equations 6)}$$

$$APL_{c1} = \frac{\psi}{2} + \text{if } (bLow1st, \theta, 0)$$

$$APU_{c2} = \frac{\psi}{2} + \text{if } (bLow1st, \theta, 0)$$

$$APL_{c2} = \frac{\psi}{2} + \text{if } (bLow1st, \theta, 0)$$

$$APU_{c3} = \frac{\psi}{2} + \Phi + \psi + \text{if } (bLow1st, 3\theta, 0)$$

$$APL_{c3} = \frac{\psi}{2} + \Phi + \psi + \text{if } (bLow1st, 3\theta, 0)$$

$$APL_{c4} = \frac{\psi}{2} + 2\Phi + \psi + \text{if } (bLow1st, 4\theta, 3\theta)$$

$$APU_{c4} = \frac{\psi}{2} + 2\Phi + \psi + \text{if } (bLow1st, 3\theta, 4\theta)$$

$$APL_{c5} = \frac{\psi}{2} + 2\Phi + 2\psi + \text{if } (bLow1st, 4\theta, 5\theta)$$

$$APU_{c5} = \frac{\psi}{2} + 2\Phi + 2\psi + \text{if } (bLow1st, 5\theta, 4\theta)$$

$$APL_{c6} = \frac{\psi}{2} + 3\Phi + 2\psi + \text{if } (bLow1st, 6\theta, 5\theta)$$

$$APU_{c6} = \frac{\psi}{2} + 3\Phi + 2\psi + \text{if } (bLow1st, 5\theta, 6\theta)$$

The x and y coordinates of the upper and lower connections points $PU_i$, $PL_i$ of the load cells 6 projected on a x-y plane can be calculated using the angles in the arrays defined by Equation 6 and the following equations:

$$PLx_i = r_{PLi}\cos(APL_i) \quad PUy_i = r_{PUi}\sin(APU_i) \quad \text{(Equations 7)}$$

$$PLy_i = r_{PLi}\sin(APL_i) \quad PUx_i = r_{PUi}\cos(APU_i)$$

Accordingly, $PLx_i$ is the x-coordinate of PL for the $i^{th}$ load cell 6, $PLy_i$ is the y-coordinate of PL for the $i^{th}$ load cell 6, $PUx_i$ is the x-coordinate of PU for the $i^{th}$ load cell 6, and $PUy_i$ is the y-coordinate of PU for the $i^{th}$ load cell 6.

FIG. 7 is an exploded view of FIG. 6 focusing on load cell C1 and shows $PLx_1$ land $PLy_1$. From the defined parameters, the connection point $PU_i$, $PL_i$ results are as follows:

$$PU_x = \begin{bmatrix} 12.437 \\ 0.65 \\ -13.086 \\ -13.086 \\ 0.65 \\ 12.437 \end{bmatrix} \quad PU_y = \begin{bmatrix} 7.93 \\ 14.736 \\ 6.805 \\ -6.805 \\ -14.736 \\ -7.93 \end{bmatrix} \quad \text{(Equations 8)}$$

$$PL_x = \begin{bmatrix} 13.265 \\ -0.569 \\ -12.697 \\ -12.697 \\ -0.569 \\ 13.265 \end{bmatrix} \quad PL_y = \begin{bmatrix} 7.002 \\ 14.989 \\ 7.987 \\ -7.987 \\ -14.989 \\ -7.002 \end{bmatrix}$$

Referring to FIG. 8, the x and y coordinates of the upper and lower connection points $PU_i$ and $PL_i$ are plotted onto plane x-y (FIG. 5). FIG. 8 depicts the exemplary embodiment of the position of the load cells 6 relative to one another. In this exemplary embodiment, each of the load cells 6 preferably is as far from parallel as possible with each of the other load cells 6. "As far from parallel as possible" does not mean that the cells are perpendicular to each other. "As far from parallel as possible: means an optimal arrangement of load cells such that an angle between any two load cells is as far from parallel as possible.

Figure 9:
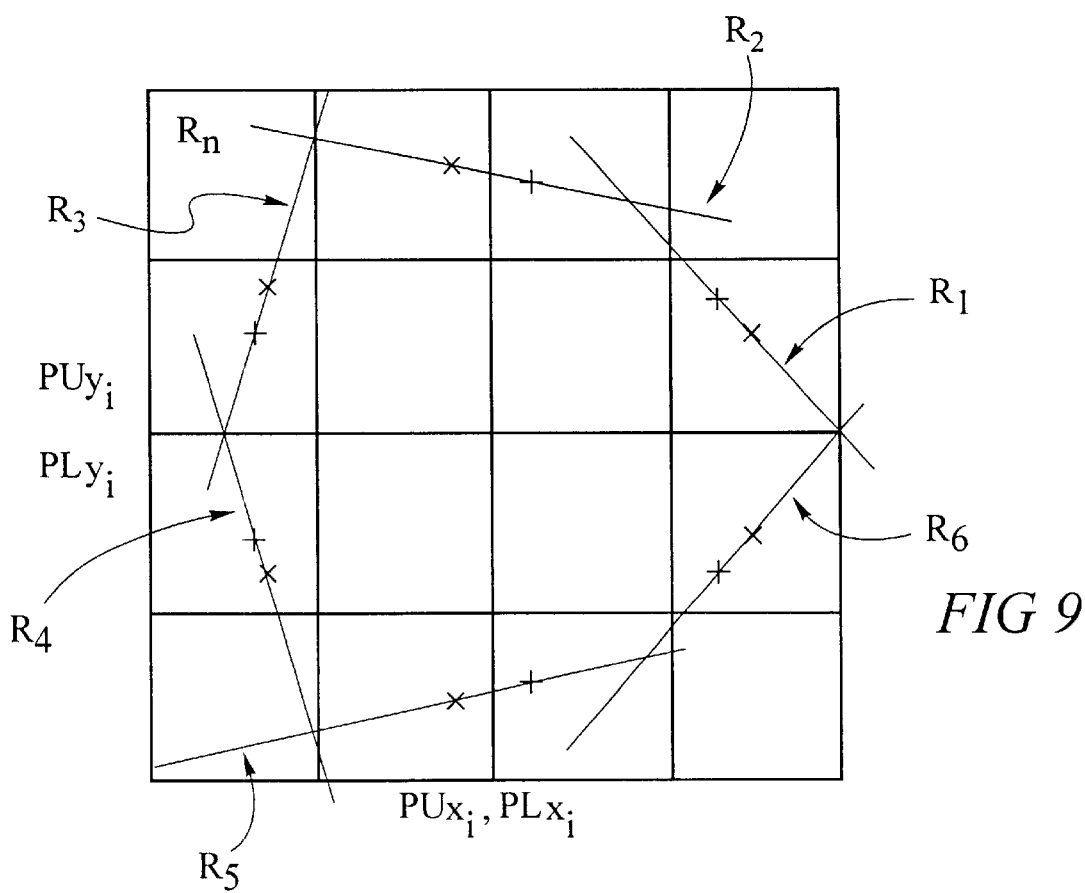
FIG. 9 graphically shows the meaning of "as far from parallel as possible" in respect to the load cells of the docking assembly of the preferred embodiment.

FIG. 9 shows what "as far from parallel as possible" means with respect to the circular arrangement of the load cells 6 of the present invention. FIG. 9 depicts the same graph as FIG. 8, showing exemplary connection points $PU_i$ and $PL_i$ of each of the load cells 6 in an x-y plane, except a straight line $R_i$ has been drawn through $PU_i$ and $PL_i$ for each of the load cells 6. $R_n$, the length $L_a$ between connection points of each load cell 6 projected into the x-y plane. For example, the upper connection points $PU_i$, are all on a circle. The lower connection points $PL_i$ are on a different concentric circle having a larger radius than the circle created by the $PU_i$. To illustrate, (still referring to FIG. 9,) if the upper and lower connection points $PU_i$, $PL_i$ lie on circles having the same radius, then R1 and R4, R2 and R5, and R3 and R6 would become parallel and R1 and R2, R3 and R4, and R5 and R6 would become farther from parallel.

Now visualize the upper connection points $PU_i$ lying on a circle smaller than the circle formed by lower connection points $PL_i$. The lines R1 and R4, R2 and R5, R3 and R6 are now no longer parallel and R1 and R2, R3 and R4, and R5 and R6 are now becoming closer to parallel. The point of this example is to illustrate the arrangement of the load cell lines of projection to be "as far from parallel as possible" or becomes an equilibrium inflection point because, as soon as two or more $R_n$ become farther from parallel, then two or more other $R_n$ become closer to parallel. By keeping the load cells 6 as far from parallel as possible with respect to one another, the error of the computed resultant force is minimized and, consequently, the accuracy of the force computation is increased.

Further, this exemplary positioning in conjunction with the spherical joints or ball bearing universal joints (not shown) located at each end of each load cell 6 provides sensing capabilities in six degrees of freedom and creates a "statically determinant" system. This statically determinant system allows computation of the composite forces/moments using the individual forces $F_i$ sensed from each load cell 6. Preferably, the closed loop control system 15 can resolve any force $F_i$ sensed by the load cells 6 into its force vectors $Fx_i$, $Fy_i$, $Fz_i$ having a known location, magnitude, and direction of application. Closed loop control system 15 calculates a composite force vector in each direction FX, FY, FZ by summing $Fx_i$, summing $Fy_i$, and summing $Fz_i$, respectively. Closed loop control system 15 also uses $Fx_i$, $Fy_i$, $Fz_i$ to calculate a composite moment about each axis MX, MY, MZ. FX, FY, and FZ are collectively referred to as $F_{xyz}$. MX, MY, and MZ are collectively referred to as $M_{xyz}$. Closed loop control system 15 uses composite force $F_{xyz}$ and composite moment $M_{xyz}$ to calculate where to move soft capture ring 13 (and consequently load sensing ring 3) to minimize the contact force $F_i$ sensed by the load cells 6. In effect, this information allows the active docking assembly 1 to automatically comply and realign itself to the passive docking assembly thereby greatly reducing or eliminating the undesirable forces that conventional docking or berthing capture creates.

Each of the vehicles being docked preferably has a docking assembly 1. Also, when docking or berthing, one docking assembly 1 is "active" while the other docking assembly 1 is "passive." The active docking assembly automatically provides misalignment compliance and attenuation to accomplish docking or berthing. The passive docking assembly act as a fixed assembly. "Fixed" is intended to mean that the passive docking assembly can be either a docking assembly which is incapable of dynamically adjusting or a docking assembly 1 which, although capable of dynamically adjusting, is made temporarily incapable of dynamically adjusting. For example, a fixed docking assembly can be fixed by locking it in place using a soft capture ring lockdown (not shown) meaning that all components are kept stationary and no control system is required.

Figure 10A:
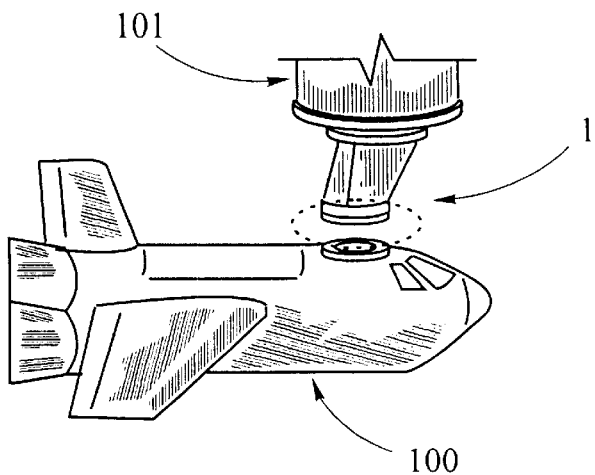
FIG. 10a shows a docking vehicle entering the capture envelope in the preferred embodiment of the docking assembly.
Figure 10B:
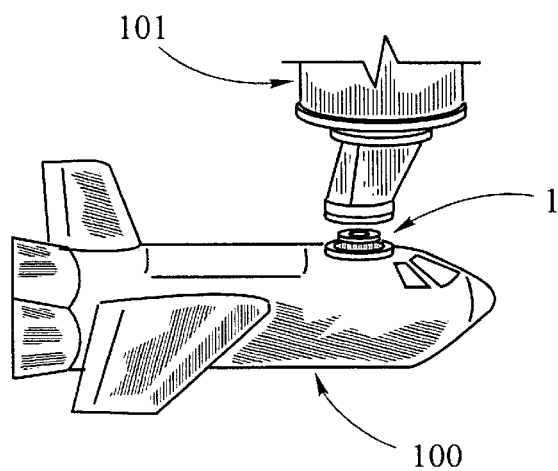
FIG. 10b shows the preferred embodiment of the docking assembly in the capture mode.
Figure 10C:
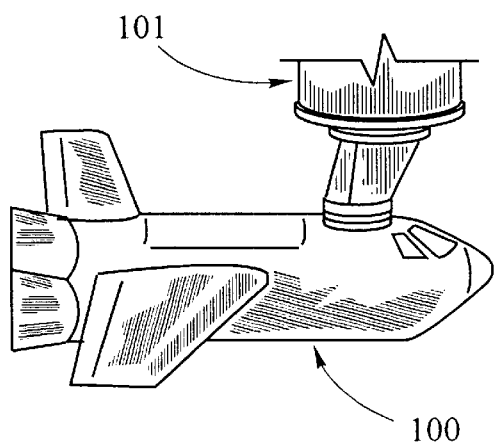
FIG. 10c shows the preferred embodiment of the docking assembly in the stabilize and retract mode.

Referring now to FIGS. 10a–c, the following discussion explains the use of the docking assembly 1 to dock two vehicles together. For illustration, and without limiting the scope of the present invention, the vehicle 100 to be docked is assumed to be a vehicle similar to the Space Transport System (the Space Shuttle), hereinafter referred to as the "docking" vehicle. For further illustration, and again without limiting the scope of the present invention, the vehicle 101 to which the docking vehicle 100 docks preferably is a space station, hereinafter referred to as the "principal" vehicle. For illustration of the preferred docking system of the present invention, docking assembly 1 on principal vehicle 101 is "passive" and docking assembly 1 on docking vehicle 100 is "active." However, the preferred embodiment is inherently redundant because either docking assembly 1 of the docking system is capable of providing the "active" role when docking or berthing.

Referring still to FIGS. 10a–10c, docking vehicle 100 must be maneuvered (either via a pilot or autonomously by remote control or by a RMS) into the capture envelope. Once inside the capture envelope, the soft capture ring 13, by extension or retraction, can achieve soft capture with positive, zero, or negative closing velocities.

Upon entering the capture envelope there are five modes of operation that include capture, attenuation, stabilization, retraction, and structural latching.

During the first four docking modes, the load sensing ring 6 on the active docking assembly 1 senses forces and moments applied to the soft capture ring 13. These forces and moments are then used in kinematic calculations. The results of the kinematic calculations are then outputted as position and orientation control signals to active docking assembly 1 on docking vehicle 100 to dynamically adjust active docking assembly 1. This process is described in further detail below.

Figure 11:
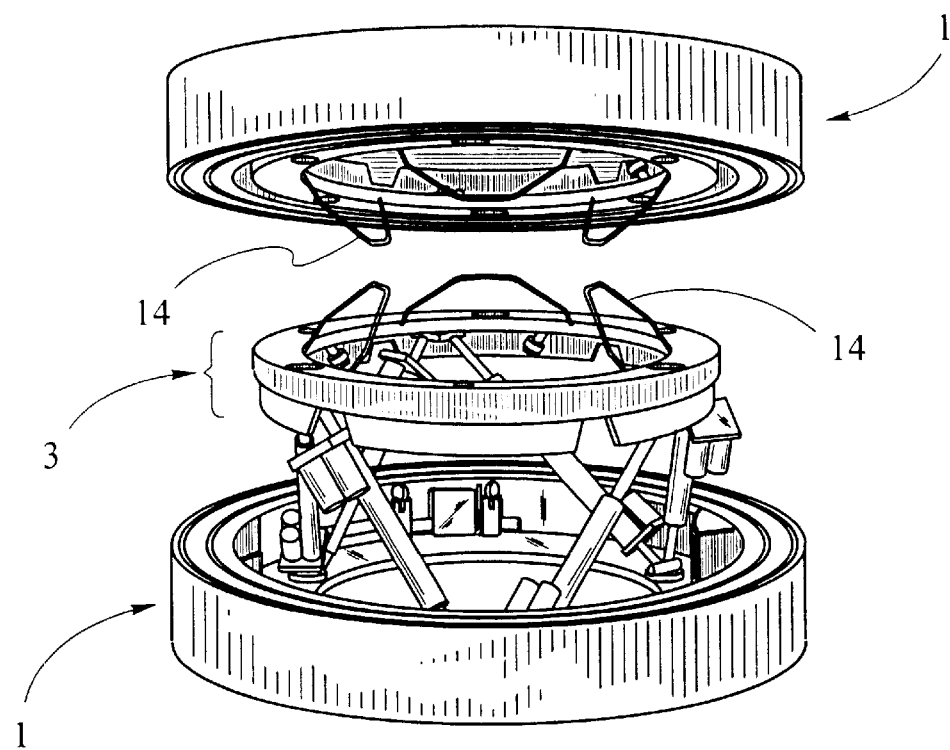
FIG. 11 shows the static guidance provided by alignment guides of the preferred docking assembly.

During the capture mode, electrical current is passed to energize the electromagnets 4 for soft capture. After entering the capture envelope and beginning with initial contact, the alignment guides 14 on the active and passive docking assemblies 1 dynamically guide the soft capture ring 13 on the active docking vehicle 100 into alignment with the passive docking assembly on the principal vehicle 101, as shown in FIG. 11. In addition, the electromagnets 4 positioned on the outer face 8 of the soft capture ring 13 on the active docking assembly 1 are delivered to corresponding striker plates 5 positioned on the outer face 8 of the soft capture ring 13 on the passive docking assembly 1 of the other vehicle. Referring to FIG. 10b, when all the electromagnets 4 and the striker plates 5 of the respective docking assemblies 1 contact, the contact switches 18 are triggered and a signal is provided to the closed loop control system 15 to change the operational mode of the active docking assembly 1 of docking vehicle 101 from a capture mode to an attenuation mode.

During the attenuation mode, Referring to FIG. 10c, the residual motion is damped out and the forces are attenuated, the active docking assembly 1, under the direction of the control system 15, transitions first into stabilization and then retraction modes.

Figure 12:
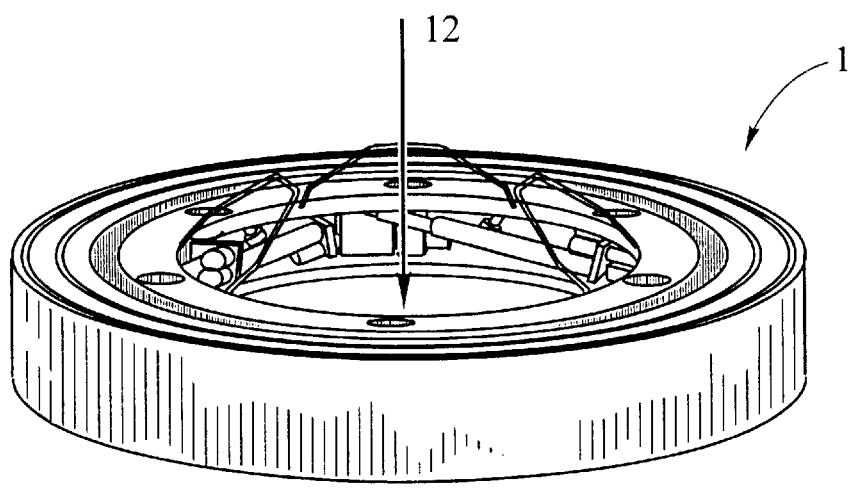
FIG. 12 depicts the pressurized transfer tunnel of the preferred docking assembly.

During the stabilize and retract modes, the docking vehicle 100 and principal vehicle 101 must be aligned such that pressure tunnel 2 can be created, sealed, and activated. In many instances however, when the stabilization and retraction mode is begun, vehicles 100, 101 are still misaligned. Thus, closed loop control system 15 directs the individual actuators 9 to physically (that is, extend or retract so as to) adjust the soft capture ring 3 to achieve proper alignment of the vehicles for sealing and latching (shown in FIG. 12). Referring to FIG. 1, after proper alignment and seal-to-seal contact, the structural latches 19 are engaged and effect a semi-permanent (rigid) structural connection between the two vehicles. Engagement of the structural latches 19 compresses and pre-loads the pressurization seals 20 to maintain a pressurized transfer volume. The semi-permanent structure creates a pressurized transfer tunnel 12 through which persons, materials, etc. can pass. After achieving this semi-permanent structural connection, the electrical current is cut off from the electromagnets 4 and the soft capture ring on the active docking assembly is disengaged from the passive docking assembly and retracted to a stowed position.

Separation of docking vehicle 100 and principal vehicle 101 occurs by releasing the structural latches 19.

The above discussion illustrates the preferred docking or berthing scenario. One facet of the preferred embodiment, which was described in general in the above illustration, is the closed loop control system 15. The following is a more detailed description of the preferred closed loop control system 15.

Figure 13:
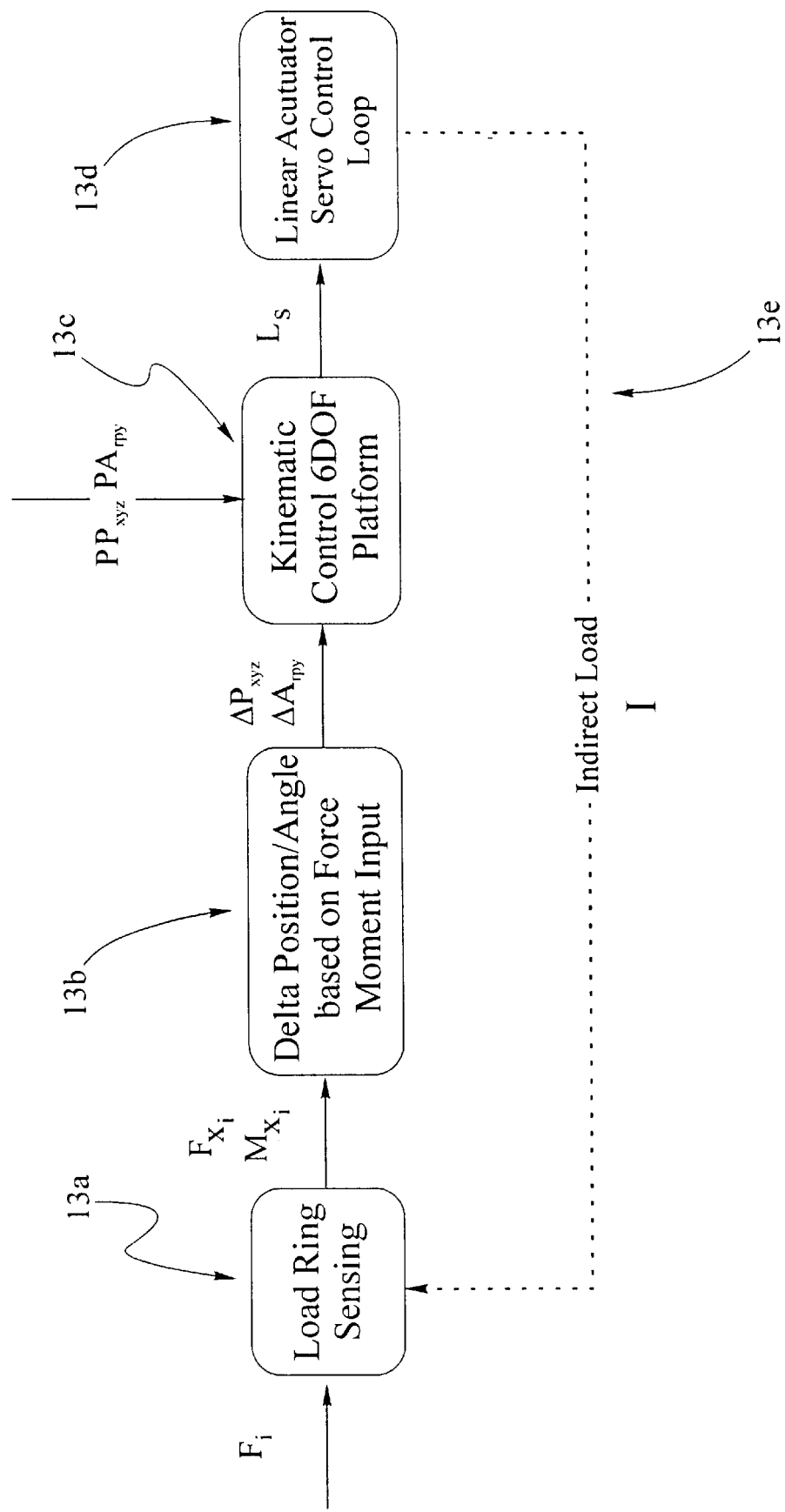
FIG. 13 is a block diagram showing an overview of the closed loop control system of the preferred docking assembly.

Turning first to FIG. 13, an overview of the closed loop control system 15 of docking assembly 1 is shown. Block 13a represents load sensing ring 3 and the load cells 6. As docking vehicle 100 contacts soft capture ring 13 of the principle vehicle, each of the load cells 6 of vehicle 100 senses the forces $F_i$ created on vehicle 100 by the contact. Using the forces $F_i$ sensed by load cells 6, control system 15 calculates the component x-y-z forces $Fx_i$, $Fy_i$, $Fz_i$ of force $F_i$. Control system 15 then sums each x-component $Fx_i$ to calculate a composite force in the x-direction FX, sums each y-component $Fy_i$ to calculate a composite force in the y-direction FY, and sums each z-component $Fz_i$ to calculate a composite force in the z-direction FZ. As previously stated, the directional composite [x, y and z] forces FX, FY, FZ are collectively denoted $F_{x,y,z}$. Further, closed loop control system 15 uses the component forces $Fx_i$, $Fy_i$, $Fz_i$ to calculate the moments acting about each axis—MX for the moments about the x-axis, MY for the moments about the y-axis, and MZ for the moments about the z-axis—created by force $F_i$ as sensed by each load cell 6.

Thereafter, as shown by block 13b, the control system 15 calculates the expected change in position $\Delta P_{xyz}$ and the expected change in angle $\Delta A_{rpy}$ of load sensing ring 3 due to composite force $F_{xyz}$ and composite moment $M_{xyz}$. Referring to block 13c, the control system 15 uses the expected change in position $\Delta P_{xyz}$ and the expected change in angle $\Delta A_{rpy}$, along with the previous global position $PP_{xyz}$ and previous global angle $PA_{rpy}$, of load sensing ring 3 to calculate a desired global position $DP_{xyz}$ of the load sensing ring 3 and a desired global angle $DA_{rpy}$ of the load sensing ring 3. Closed loop control system 15 further calculates the desired length $L_s$ of each of the actuators 9 (where "s" represents the number of one of the six actuators 9), required to dynamically adjust the load sensing ring to desired position. A signal representing the desired length $L_s$ is transmitted to each of the actuators 9, which then dynamically adjusts to its respective $L_s$. Finally, the load cells 6 sense indirect load I. The indirect load I is any force sensed by the load cells 6 that is not caused solely and directly by the motion of the docking vehicle 100 or its load sensing ring 3. The indirect load I can result from many factors, including the actuators 9 being adjusted to their desired length $L_s$ or a reduction of forces caused by the movement of load sensing ring 3 away from the docking vehicle 100. The closed loop control system repeats continuously in real-time.

In summary, FIG. 13 depicts an overview of the operation of the docking assembly 1 of the preferred embodiment of the present invention. Closed loop control system 15 calculates the dynamic adjustment required of the actuators 9 on active docking assembly 1. Closed loop control system 15 then directs the actuators 9 to dynamically adjust soft capture ring 3 to minimize, and eventually attenuate and/or dissipate all, the residual motion and/or forces sensed by the load cells 6.

Figure 14:
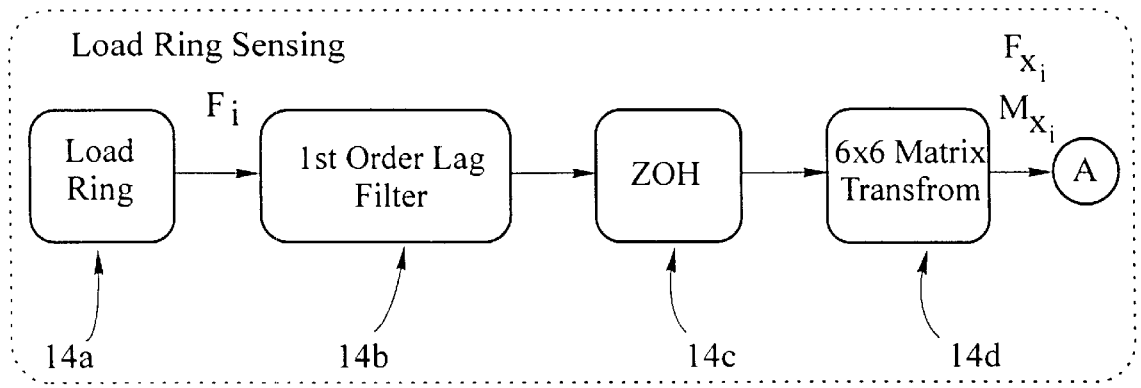
FIG. 14 is an expanded view of block 13a of FIG. 13.

With this overview as a backdrop, the following discussion includes a detailed view of closed loop control system 15. FIG. 14 is an expanded block diagram of block 13a in FIG. 13. Block 14a depicts the load sensing ring 3 and the load cells 6. As stated above, as principle vehicle 101 contacts load sensing ring 3, each load cells 6 senses a force $F_i$ created by that contact. In the preferred embodiment, the number i of load cells 6 equals six. A first order lag filter 14b preferably is a low pass filter which filters force $F_i$ to attenuate higher frequency noise.

After filter 14b attenuates the higher frequency content of force $F_i$, the zero order hold 14c samples force $F_i$ at discrete intervals. The control system 15 then use a matrix transformation (as detailed below) to convert force $F_i$ into a composite of three dimensional force vectors $F_{xyz}$ and moments about each axis $M_{xyz}$, as shown by block 14d.

The preferred matrix transformation is:

$$\begin{bmatrix} FX \\ FY \\ FZ \\ MX \\ MY \\ MZ \end{bmatrix} = JF_i - \begin{bmatrix} FXoff \\ FYoff \\ FZoff \\ MXoff \\ MYoff \\ MZoff \end{bmatrix} \quad \text{(Equation 9)}$$

The constant matrix J in Equation 9 is based on the geometry of the docking assembly 1 and in particular the load cells connection points of $PU_i$ and $PL_i$ and is defined by Equations 10:

$$J_{1,i} = \cos(\beta) \cdot \cos(\alpha_i)$$

$$J_{2,i} = \cos(\beta) \cdot \sin(\alpha_i)$$

$$J_{3,i} = \sin(\beta)$$

$$J_{4,i} = \sin(\beta) \cdot (PUy_i + Yoff) - \cos(\beta) \cdot \sin(\alpha_i) \cdot Zoff$$

$$J_{5,i} = -\sin(\beta) \cdot (PUx_i + Xoff) + \cos(\beta) \cdot \cos(\alpha_i) \cdot Zoff$$

$$J_{6,i} = \cos(\beta) \cdot \sin(\alpha_i) \cdot (PUx_i + Xoff) - \cos(\beta) \cdot \cos(\alpha_i) \cdot (PUy_i + Yoff) \quad \text{(Equations 10)}$$

The constant matrix J is pre-calculated once from the geometric properties of load sensing ring 3, namely angle $\beta$ (shown in FIG. 3), angle $\alpha_i$ of each of the load cells 6 projected into plane XY (detailed below and shown in FIG. 15), the upper and lower connection points $PU_i$ and $PL_i$ of the of each load cells 6, any offsets from the center axes, and the number i of load cells 6.

Figure 15:
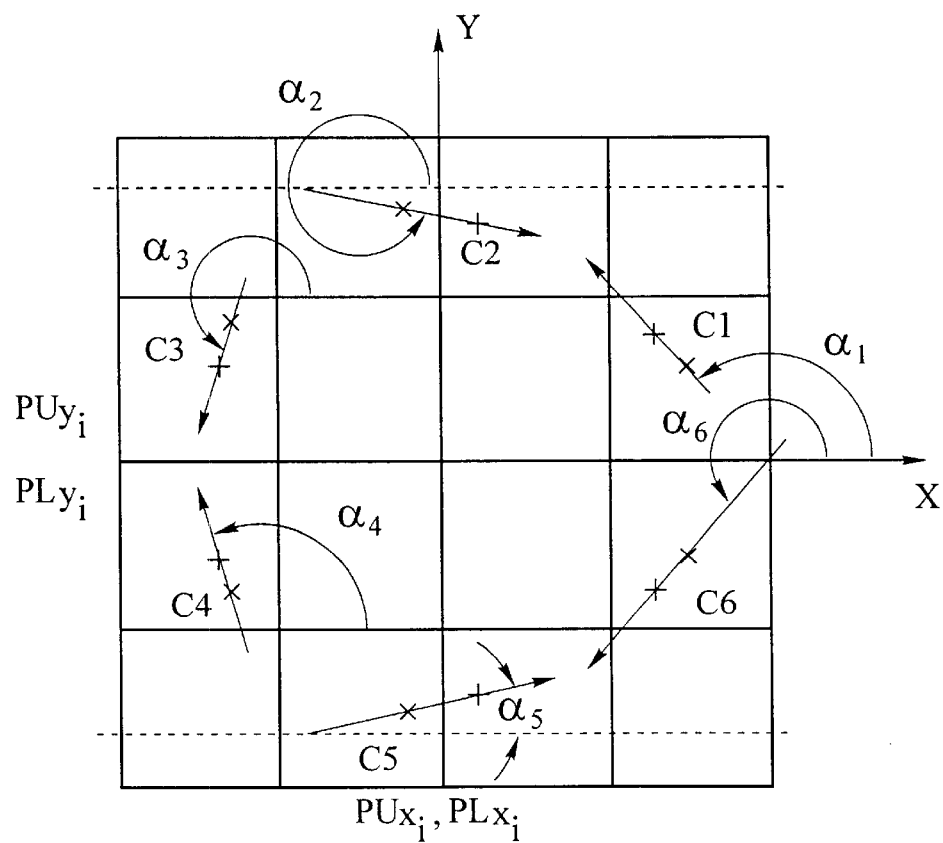
FIG. 15 shows the angle α of each of the load cells in the preferred docking assembly projected into the x-y plane in reference to the positive x-axis.

To derive Equation 9, one should first refer to FIGS. 7 and 15. There, the angle $\alpha_i$ of each of the load cells 6 projected into plane XY is calculated relative to the x-axis and is defined as:

$$\alpha_i = \text{angle}(PUx_i - PLx_i, PUy_i - PLy_i). \quad \text{(Equation 11)}$$

$PUx_i$ is the x-coordinate in coordinate system R of upper connection point $PU_i$, $PUy_i$ is the y-coordinate in coordinate system R (FIG. 5) of upper connection point $PU_i$, $PLx_i$ is the x-coordinate in coordinate system R of the lower connection point $PL_i$, and $PLy_i$ is the y-coordinate in coordinate system R of the lower connection point $PL_i$.

As shown by Equations 12 below, closed loop control system 15 calculates the x-y-z components $Fx_i$, $Fy_i$, $Fz_i$ of force $F_i$. Further, as shown by Equations 13 below, closed loop control system 15 also calculates the moments $Mx_i$, $My_i$, and $Mz_i$ about each axis acting on load sensing ring 3 based on components $Fx_i$, $Fy_i$, $Fz_i$ and accounting for any position offset Xoff, Yoff, Zoff.

$$Fx_i = F_i \cos(\beta)\cos(\alpha_i) \quad \text{(Equations 12)}$$
$$Fy_i = F_i \cos(\beta)\cos(\alpha_i)$$
$$Fz_i = F_i \sin(\beta)$$

$$Mx_i = Fz_i(PUy_i) - Fy_i \quad \text{(Equations 13)}$$
$$My_i = (-Fz)_i(PUx_i) + Fx_i Zoff$$
$$Mz_i = Fy_i(PUx_i + Xoff) - Fx_i(PUy_i + Yoff)$$

Closed loop control system 15 then calculates the composite force in each direction FX, FY, FZ by summing the respective component force $Fx_i$, $Fy_i$, $Fz_i$ for each of the load cells 6 and then subtracting any force offset FXoff, FYoff, Fzoff, as shown by Equations 14 below. Finally, closed loop control system 15 calculates the composite moment acting about each axis MX, MY, MZ by summing the respective moments $Mx_i$, $My_i$, $Mz_i$ and subtracting and moment offset MXoff, MYoff, Mzoff as shown by Equations 15.

$$FX = \sum_{(i=1\ldots 6)} Fx_i - FXoff \quad \text{(Equations 14)}$$

$$FY = \sum_{(i=1\ldots 6)} Fy_i - FYoff$$

$$FZ = \sum_{(i=1\ldots 6)} Fz_i - FZoff$$

$$MX = \sum_{(i=1\ldots 6)} Mx_i - MXoff \quad \text{(Equations 15)}$$

$$MY = \sum_{(i=1\ldots 6)} My_i - MYoff$$

$$MZ = \sum_{(i=1\ldots 6)} Mz_i - MZoff$$

Equations 14 and 15 are combined to form six simultaneous Equations 16:

$$FX = \sum_{(i=1\ldots 6)} F_i \cos(\beta)\cos(\alpha_i) - FXoff \quad \text{(Equations 16)}$$

$$FY = \sum_{(i=1\ldots 6)} F_i \cos(\beta)\cos(\alpha_i) - FYoff$$

$$FZ = \sum_{(i=1\ldots 6)} F_i \cos(\beta)\cos(\alpha_i) - FZoff$$

$$MX = \sum_{(i=1\ldots 6)} [F_i \sin(\beta)(PUy_i - Yoff) + F_i \cos(\beta)\sin(\alpha_i) Zoff] - MXoff$$

$$MY = \sum_{(i=1\ldots 6)} [-F_i \sin(\beta)(PUx_i - Xoff) - F_i \cos(\beta)\sin(\alpha_i) Zoff] - MYoff$$

$$MZ = \sum_{(i=1\ldots 6)} [F_i \sin(\beta)\sin(\alpha_i)(PUx_i - Xoff) + (-F)_i \cos(\beta)\cos(\alpha_i)(PUy_i - Yoff)] - MZoff$$

One of skill in the art can place the six Equations 16 in matrix format, shown in Equation 9 above.

Figure 16A:
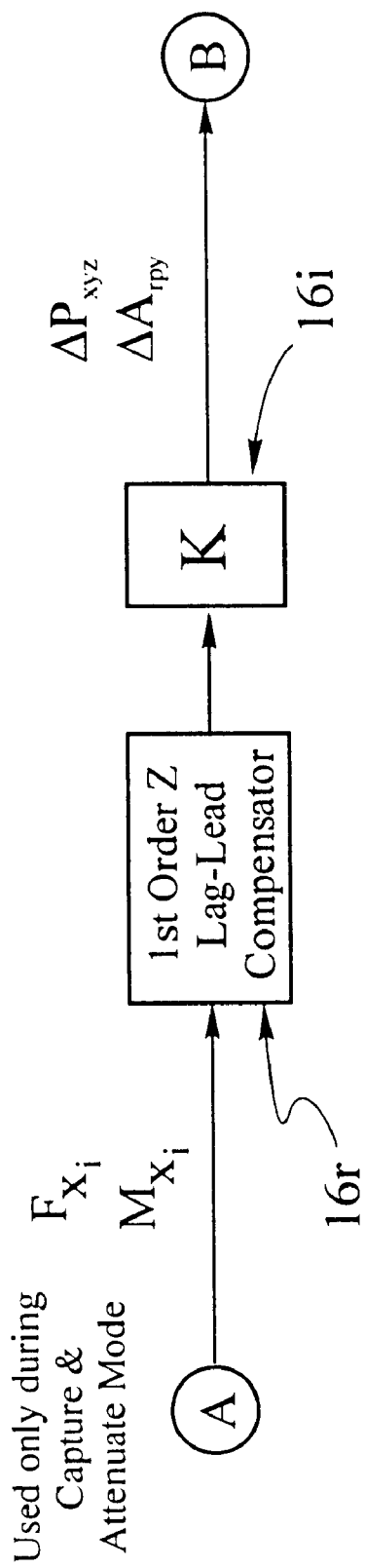
FIG. 16 is an expanded view of block 13b of FIG. 13.
Figure 16B:
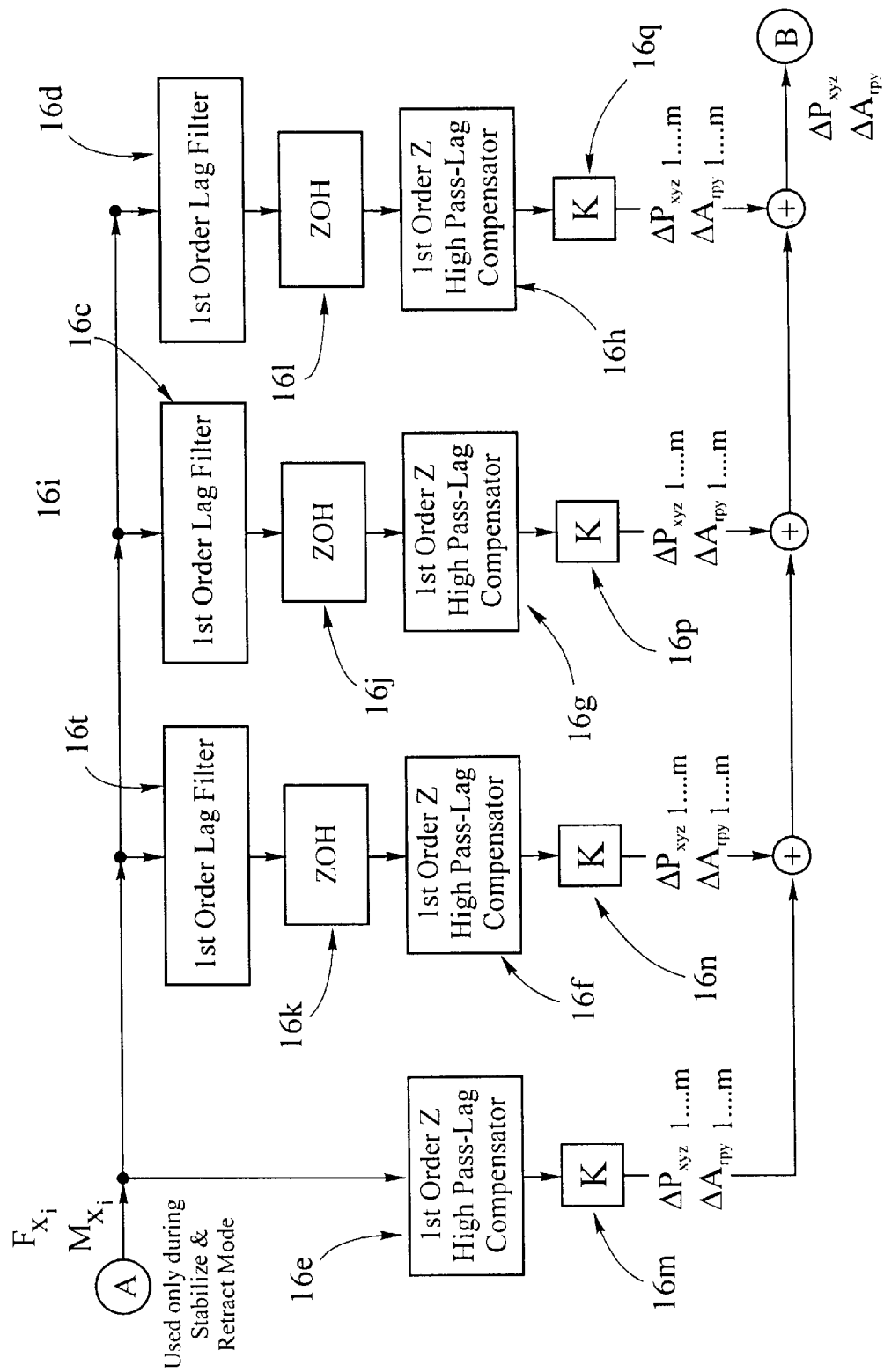

Turning to FIG. 16, after calculating, composite force $F_{xyz}$ and composite moment $M_{xyz}$, closed loop control system 15 then calculates the expected change in position $\Delta P_{xyz}$ and expected change in angle $\Delta A_{rpy}$ of load sensing ring 3 due to forces imposed on load sensing ring by vehicle 101 and as sensed by the load cells 6. The blocks shown in FIGS. 16a and 16b are expanded views of block 13c in FIG. 13. FIG. 16a shows the calculation of $\Delta P_{xyz}$ and $\Delta A_{rpy}$ of load sensing ring 3 when docking assembly 1 is in the capture and attenuation modes, while FIG. 16b shows the calculation of $\Delta P_{xyz}$ and $\Delta_{A_{rpy}}$ when docking assembly 1 is in the stabilize and retract modes.

Referring to FIG. 16a, when the docking assembly 1 is in the capture and attenuation modes, $F_{xyz}$ and $M_{xyz}$ pass through a first order lag-lead compensator 16r having a sample time of 0.02 seconds and can be represented by the following difference equation:

Output(n)=G·Input(n)−G·A Input(n−1)+B·Output(n−1) (Equation 17)

In the preferred embodiment, one of skill in the art can implement difference Equation 17 on a computer. One of skill in the art can derive difference Equation 17 by modeling by lag-lead compensator 16r in the s-domain:

$$H1(s) = \frac{1 + \tau_B \cdot s}{1 + \tau_A \cdot s} \quad \text{(Equation 18)}$$

Further, one of skill in the art can convert Equation 18 to a z-domain equation by using the backward rectangular transform:

$$s = \frac{1}{T}(1 - z^{-1}) \quad \text{(Equation 19)}$$

In Equations 18–19, T is sample time, τ is the time constant from which the break frequencies are derived. Using Equations 18–19, one of skill in the art can derive the equation that models the preferred lag-lead compensator 16r in the z-domain:

$$H2(z) = \left[ \frac{\frac{T}{T+\tau_B}\left[1 - \left(1 - \frac{T}{T+\tau_A}\right)z^{-1}\right]}{\frac{T}{T+\tau_A}\left[1 - \left(1 - \frac{T}{T+\tau_B}\right)z^{-1}\right]} \right] \quad \text{(Equation 20)}$$

One of skill in the art can implement Equation 20 into a computer by defining difference Equation 17 above to model Equation 20, and thus model lag-lead compensator 16r.

To derive difference Equation 17, one of skill in the art can recognize using Equation 21–27 below.

$$K_A = \frac{T}{T + \tau_A} \quad \text{(Equation 21)}$$

$$K_B = \frac{T}{T + \tau_B} \quad \text{(Equation 22)}$$

$$H(z) = \left[\frac{\frac{K_B}{K_A}[z - (1 - K_A)]}{[z - (1 - K_B)]}\right] \quad \text{(Equation 23)}$$

$$\frac{K_B}{K_A} \ggg G \quad \text{(Equation 24)}$$

$$(1 - K_A) \ggg A \quad \text{(Equation 25)}$$

$$(1 - K_B) \ggg B \quad \text{(Equation 26)}$$

$$H(z) = G\frac{z - A}{z - B} \quad \text{(Equation 27)}$$

In equations 21–27, G is the gain in the z-domain, A is the zero in the z-domain, B is the pole in the z-domain, and K is the frequency variable gain.

As one of skill in the art appreciates, to accurately represent the gain G in the model of compensator 16r, closed loop control system 15 calculates and adjusted gain GG by dividing gain G by the ratio of frequency variable gains K as shown in Equation 28:

$$GG = \frac{G}{\left(\frac{K_B}{K_A}\right)} \quad \text{(Equation 28)}$$

One of skill in the art recognizes that Equation 20 can be written as:

$$\frac{\text{Output}(z)}{\text{Input}(z)} = H(z). $$

Further, one of skill in the art recognizes that after substituting Equation 27 for H(z) and applying the inverse transform $$\frac{\text{Output}(z)}{\text{Input}(z)} = G\frac{1 - Az^{-1}}{1 - Bz^{-1}}, \quad \text{(Equation 29)}$$

the result is the difference Equation 17 above, where "n" represents the time difference.

Referring now to FIG. 16b, when the docking assembly of the preferred embodiment is in the stabilization and retraction mode, closed loop control system 15 uses multiple lag filters 16t, 16c, 16d having varying break frequencies and multiple high pass compensators 16e, 16f, 16g, 16h to calculate the desired change in position $\Delta P_{xyz}$ and the expected change in angle $\Delta A_{rpy}$. The stabilization and retraction modes occur after soft capture of docking vehicle 100 is achieved, i.e., after the electromagnets 4 contact the striker plates 5.

Given that many docking scenarios involve a docking vehicle 100 of large mass, composite force $F_{xyz}$ and composite moment $M_{xyz}$ occur over a wide range of frequencies. FIG. 16b shows the preferred analysis of $F_{xyz}$ and $M_{xyz}$ over such a range of frequencies by utilizing multiple lag filters 16t, 16c, 16d having varying break frequencies and multiple high pass lag compensators 16e, 16f, 16g, 16h. Preferably, lag filter 16t has a certain break frequency of 0.125 Hz, lag filter 16c has a break frequency less than 16t and preferably 0.0625 Hz, and lag filter 16d has a break frequency less than 16c and preferably 0.0078 Hz. The sample time of filters 16t, 16c, 16d and of compensator 16e is the overall sample time represented by the zero order hold (ZOH) of closed loop control system 15, which is shown by block 14c in FIG. 14 and preferably is 0.02 seconds.

Referring still to FIG. 16b, while the sample time of filters 16t, 16c, 16d and compensator 16e is the sample time 14c of the overall control loop, closed loop control system 15 slows down the sample time when the composite force $F_{xyz}$ and composite moment $M_{xyz}$ occur at lower frequencies as shown by zero order holds (ZOH) 16k, 16j, 16l. Preferably, as the frequencies of $F_{xyz}$ and $M_{xyz}$ decrease, the sample time of compensators 16e, 16f, 16g, 16h increases to allow the compensator to see changes from the previous sample.

Still referring to FIG. 16b, one of skill in the art recognizes that compensators 16e, 16f, 16g, 16h can be modeled in the z-domain by Equation 20 above. Accordingly, compensators 16e, 16f, 16g, 16h are represented by difference Equation 17 above, which one of skill in the art can implement into a computer.

Closed loop control system 15 applies gains 16m, 16n, 16p, 16q to the respective output of compensators 16e, 16f, 16g, 16h, resulting in a partial expected change in position $p_1 \ldots {}_m \Delta P_{xyz}$ and a partial expected change in angle $p_1 \ldots {}_m \Delta A_{rpy}$ of the load sensing ring 3, where m represents the number of compensators utilized in the stabilization and retraction modes. Preferably, the number of compensators "m" equals four but could be more or less than four. As shown by FIG. 16b, closed loop control system 15 sums $P_{1 \ldots m} \Delta P_{xyz}$ to calculate the expected change in position $\Delta P_{xyz}$ of load sensing ring 3. Closed loop control system 15 also sums $P_{1 \ldots m} \Delta A_{rpy}$ to calculate the expected change in angle $\Delta A_{rpy}$ of load sensing ring 3.

Still referring to FIG. 16b, preferrably compensator 16e has a sample time T of 0.02 seconds, a gain G in the z-domain of 0.25, a pole B in the z-domain of –0.2, and a zero A in the z-domain of 0.9999999. Preferably compensator 16f has a sample time T of 0.1 seconds, a gain G in the z-domain of 1.5 5.0, a pole B in the z-domain of 0.5, and a zero A in the z-domain of 0.9999999. Preferably compensator 16g has a sample time T of 0.5 seconds, a gain G in the z-domain of 0.2 5.0 5.0, a pole B in the z-domain of 0.9, and a zero A in the z-domain of 0.9999999. Preferably compensator 16h has a sample time T of 2.5 seconds, a gain G in the z-domain of 0.1 5.0 5.0 5.0, a pole B in the z-domain of 0.9, and a zero A in the z-domain of 0.9999999.

As one of skill in the art will recognize, the lag filters 16t, 16c, 16d in FIG. 16b are modeled by difference Equation 30.

$$\text{Output}(n) = \text{Output}(n-1) + k1(\text{Input}(n) - \text{Output}(n-1)) \quad \text{(Equation 30)}$$

One skilled in the art can implement difference Equation 30 on a computer with floating point math.

Difference Equation 30 can be derived from first order lag filter s-domain Equation 31.

$$H(s) = \frac{1}{1 + \tau \cdot s} \quad \text{(Equation 31)}$$

One of skill in the art can convert Equation 31 to a z-domain equation by using the backward rectangular transform Equation 19 (above). In Equation 31, T is sample time and τ is the time constant from which the break frequencies are derived. Using Equations 31 and 19, one of skill in the art can derive the equation that models the preferred lag filters 16t, 16c, 16d in the z-domain:

$$H(z) = \frac{\frac{T}{T+\tau}}{1 - \left(1 - \frac{T}{T+\tau}\right) \cdot z^{-1}} \quad \text{(Equation 32)}$$

By defining $$k1 = \frac{T}{T+\tau}, \quad \text{(Equation 33)}$$

one of skill in the art can re-write Equation 32 as:

$$H(z) = \frac{k1}{[1 - (1 - k1)z^{-1}]} \quad \text{(Equation 34)}$$

One of skill in the art will recognize that Equation 32 itself can be re-written as $$\frac{\text{Output}(z)}{\text{Input}(z)} = H(z).$$

Substituting this into H(z) of Equation 34 results in:

$$\frac{\text{Output}(z)}{\text{Input}(z)} = \frac{k1}{[1-(1-k1)z^{-1}]} \qquad \text{(Equation 35)}$$

Re-arranging and applying the inverse transform to Equation 35 results in difference Equation 30 (above), where "n" represents the time difference.

To implement difference Equation 30 in integer math, one of skill in the art will recognize to take the inverse of k1, Ik1.

$$Ik1 = \frac{1}{k1} \qquad \text{(Equation 36)}$$

$$Ik1 \geq 1 \qquad \text{(Equation 37)}$$

The difference Equation 30 now takes the following form:

$$\text{Output}(n) = \text{Output}(n-1) + \qquad \text{(Equation 38)}$$

$$\frac{\text{Input}(n)}{Ik1} - \frac{\text{Output}(n-1)}{Ik1}$$

To have the Input(n) be as precise as possible, the Input(n) is multiplied by Ik1. This mathematical slight of hand scales the Output(n) by Ik1. Therefore, to obtain the final result, the Output(n) is divided by Ik1. Shifts can be used for the division if powers of two are determined for the Ik1 value. The resulting equations are now more easily implemented with integer math:

$$\text{Output}(n) = \text{Output}(n-1) + \text{Input}(n) - \qquad \text{(Equation 39)}$$
$$\frac{\text{Output}(n-1)}{Ik1}$$

$$\text{The Output}(n) = \frac{\text{Output}(n)}{Ik1} \qquad \text{(Equation 40)}$$

Notice Input(n) is not really scaled upwards, it is just not divided by Ik1. The only history storage requirement between update cycles is the value Output. Thus, closed loop control system 15 only needs the previous output value Output (n−1) to calculate Output(n). Control system 15 applies gains 16m, 16n, 16p, 16q to the output of each compensator 16e, 16f, 16g, 16h, resulting in the expected change in position $\Delta P_{xyz}$ and expected change in angle $\Delta A_{rpy}$.

Figure 17:
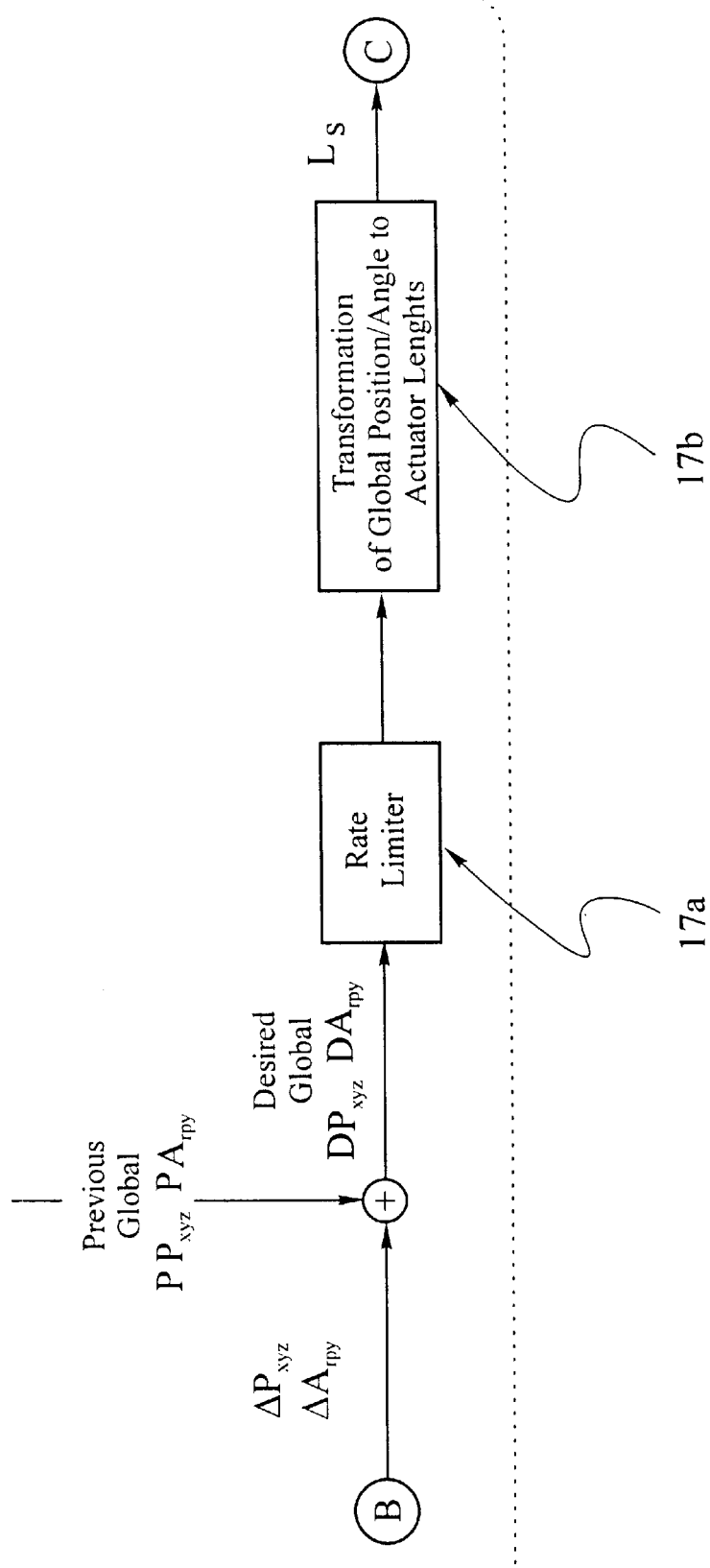
FIG. 17 is an expanded view of block 13c of FIG. 13.
Figure 18:
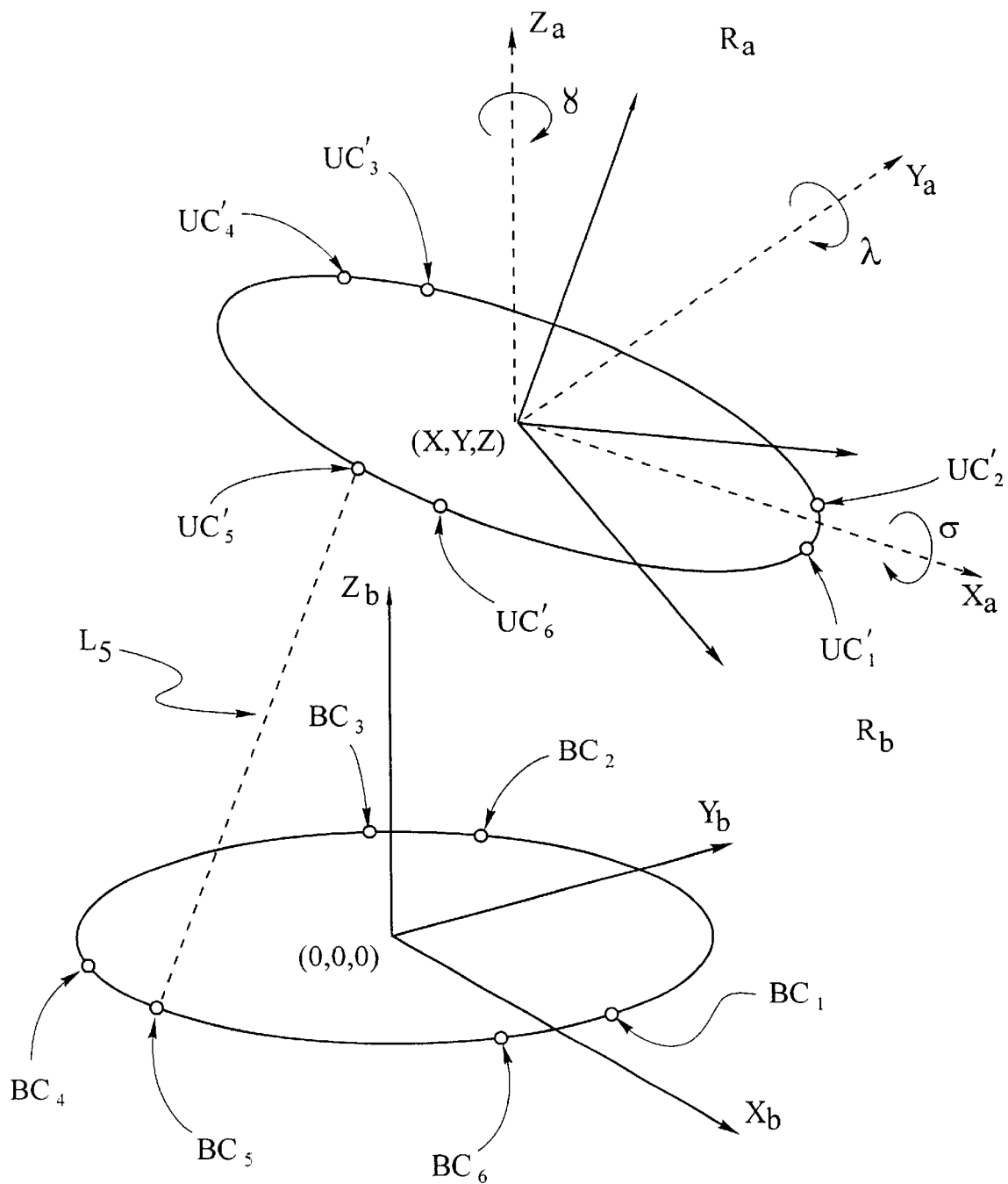
FIG. 18 shows the active coordinate system for the upper connection points of the actuators and the base coordinate system for the base connection points of the actuators.

Referring to FIGS. 17 and 18, in the preferred embodiment, after the expected change in position $\Delta P_{xyz}$ and expected change in angle $\Delta A_{rpy}$ of the load sensing ring 3 have been calculated, closed loop control system 15 calculates the length $L_s$ (where "s" is the number of one of the six actuators 9) that the length each of the actuators 9 must be moved to attain the desired global position $DP_{xyz}$ and desired global angle $DA_{rpy}$ of load sensing ring 3.

FIG. 17 is an exploded block diagram of the "Kinematic Control 6DOF Platform" block in FIG. 13 and depicts the method for calculating $DP_{xyz}$ and $DA_{rpy}$. FIG. 18 shows the active coordinate system $R_a$ for the upper connection points $UC_s$ the actuators and the base coordinate system $R_b$ the lower connection points $BC_s$ of the actuators.

In calculating $L_s$, closed loop control system 15 uses the expected change in position $\Delta P_{xyz}$ and the expected change in angle $\Delta A_{rpy}$ of load sensing ring 3 as well as the previous global position $PP_{xyz}$ and previous global angle $PA_{rpy}$ of load sensing ring 3. Closed loop control system 15 calculates the desired global position $DP_{xyz}$ by summing the expected change in position $\Delta P_{xyz}$ and the previous position $PP_{xyz}$ of load sensing ring 3. Closed loop control system 15 also calculates the desired global angle $DA_{rpy}$ by summing the expected change in angle $\Delta A_{rpy}$ and the previous angle $PA_{rpy}$ of load sensing ring 3. $DP_{xyz}$ and $DA_{rpy}$ then pass through a rate limiter. Rate limiter 17a limits the rate at which the load sensing ring 3 can move. Thus, in the case of large loads, rate limiter 17a prevents the load sensing ring 3 from moving too fast. Therefore, saturation of actuators 9 is prevented.

After calculating $DP_{xyz}$ and $DA_{rpy}$, closed loop control system 15 uses Equations 47 (below), depicted by block 17b, to calculate the x, y, and z coordinates in coordinate system $R_a$ to which the upper connection points $UC_s$ of each actuator 9 must move $UC_s'$ (FIG. 18) to achieve the desired global position $DP_{xyz}$ and the desired global angle $DA_{rpy}$ of load sensing ring 3. Preferably, the number "s" of actuators 9 equals six. $UCx'_s$, $UCy'_s$, and $UCz'_s$ are the x, y, z coordinates respectively of $UC'_s$ in coordinate system $R_a$. One of skill in the art can calculate the length $L_s$ each actuator must move given the new upper connection points $UC'_s$ of each of the actuators 9 in the active coordinate system $R_a$ and the base connection points $BC_s$ of each of the actuators 9 in the base coordinate system $R_b$ by using the following equation:

$$L_s = \sqrt{(UCx'_s - BCx_s)^2 + (UCy'_s - BCy_s)^2 + (UCz'_s - BCz_s)^2} \qquad \text{(Equation 41)}$$

In Equation 41, $BCx_s$, $BCy_s$, and $BCz_s$ are the x, y, z coordinates respectively of $BC_s$ in coordinate system $R_b$. To points on the active plane can be translated back to the base coordinate system using the principle 3-D rotations equations:

X-axis of rotation:

$$UCx'_s = x\cos(\sigma) - y\sin(\sigma)$$

$$UCy'_s = x\sin(\sigma) + y\cos(\sigma)$$

$$UCz'_s = z \qquad \text{(Equations 42)}$$

Y-axis of rotation:

$$UCx'_s = x\cos(\lambda) + z\sin(\lambda)$$

$$UCy'_s = y$$

$$UCz'_s = -\lambda\sin(x) + z\cos(\lambda) \qquad \text{(Equations 43)}$$

Z-axis of rotation:

$$UCx'_s = x$$

$$UCy'_s = y\cos(\gamma) - z\sin(\gamma)$$

$$UCz'_s = y\sin(\gamma) + z\cos(\gamma) \qquad \text{(Equation 44)}$$

Rewriting the principle 3-D rotations Equations 42–44 in matrix form:

| X-axis of rotation | Y-axis of rotation | Z-axis of rotation | (Equations 45) |

$$\begin{bmatrix} \cos(\sigma) & -\sin(\sigma) & 0 \\ \sin(\sigma) & \cos(\sigma) & 0 \\ 0 & 0 & 1 \end{bmatrix} \begin{bmatrix} \cos(\lambda) & 0 & \sin(\lambda) \\ 0 & 1 & 0 \\ -\sin(\lambda) & 0 & \cos(\lambda) \end{bmatrix} \begin{bmatrix} 1 & 0 & 0 \\ 0 & \cos(\gamma) & -\sin(\gamma) \\ 0 & \sin(\gamma) & \cos(\gamma) \end{bmatrix}$$

General three-dimensional rotation of the point in a 3-D coordinate space can be written as the composite of principle rotations, that is, apply a sequence of principle 3-D rotations, one after the other. A composite of a general 3-D rotation is given by the matrix multiplication of the three principle 3-D rotations and results in:

$$\begin{bmatrix} (\cos(\sigma)\cos(\lambda)) & (\cos(\sigma)\sin(\lambda)\sin(\gamma) - \sin(\sigma)\cos(\gamma)) & (\cos\sigma)\sin(\lambda)\cos(\gamma) + \sin(\sigma)\sin(\gamma)) \\ (\sin(\sigma)\cos(\lambda)) & (\sin(\sigma)\sin(\lambda)\sin(\gamma) + \cos(\sigma)\cos(\gamma)) & (\sin\sigma)\sin(\lambda)\cos(\gamma) - \cos(\sigma)\sin(\gamma)) \\ -\sin(\lambda) & \cos(\lambda)\sin(\gamma) & (\cos(\lambda)\cos(\gamma)) \end{bmatrix}$$ Equation 46

The general 3-D rotation of the points with x, y, z desired translation can now be written directly as:

$UCx'_s = UCx_s \cos(\sigma)\cos(\lambda) + UCy_s(\cos(\sigma)\sin(\lambda)\sin(\gamma)-\sin(\sigma)\cos(\gamma)) + UCz_s(\cos(\sigma)\sin(\lambda)\cos(\gamma)+\sin(\sigma)\sin(\gamma)) + DPx_s$ $UCy'_s = UCy_s \sin(\sigma)\cos(\lambda) + UCy_s(\sin(\sigma)\sin(\lambda)\sin(\gamma)+\cos(\sigma)\cos(\gamma)) + UCz_s(\sin(\sigma)\sin(\lambda)\cos(\gamma)-\cos(\sigma)\sin(\gamma)) + DPy_s$ $UCz'_s = -(UCx_s)\sin(\lambda) + UCy_s \cos(\lambda)\sin(\gamma) + UCz_s \cos(\lambda)\cos(\gamma) + DPz_s$ (Equation 47)

Given the new upper connection points $UC'_s$ for all axes and given the base connection points $BC_s$, one of skill in the art can calculate the desired length $L_s$ that each actuator 9 must move using Equation 41 above.

Figure 19:
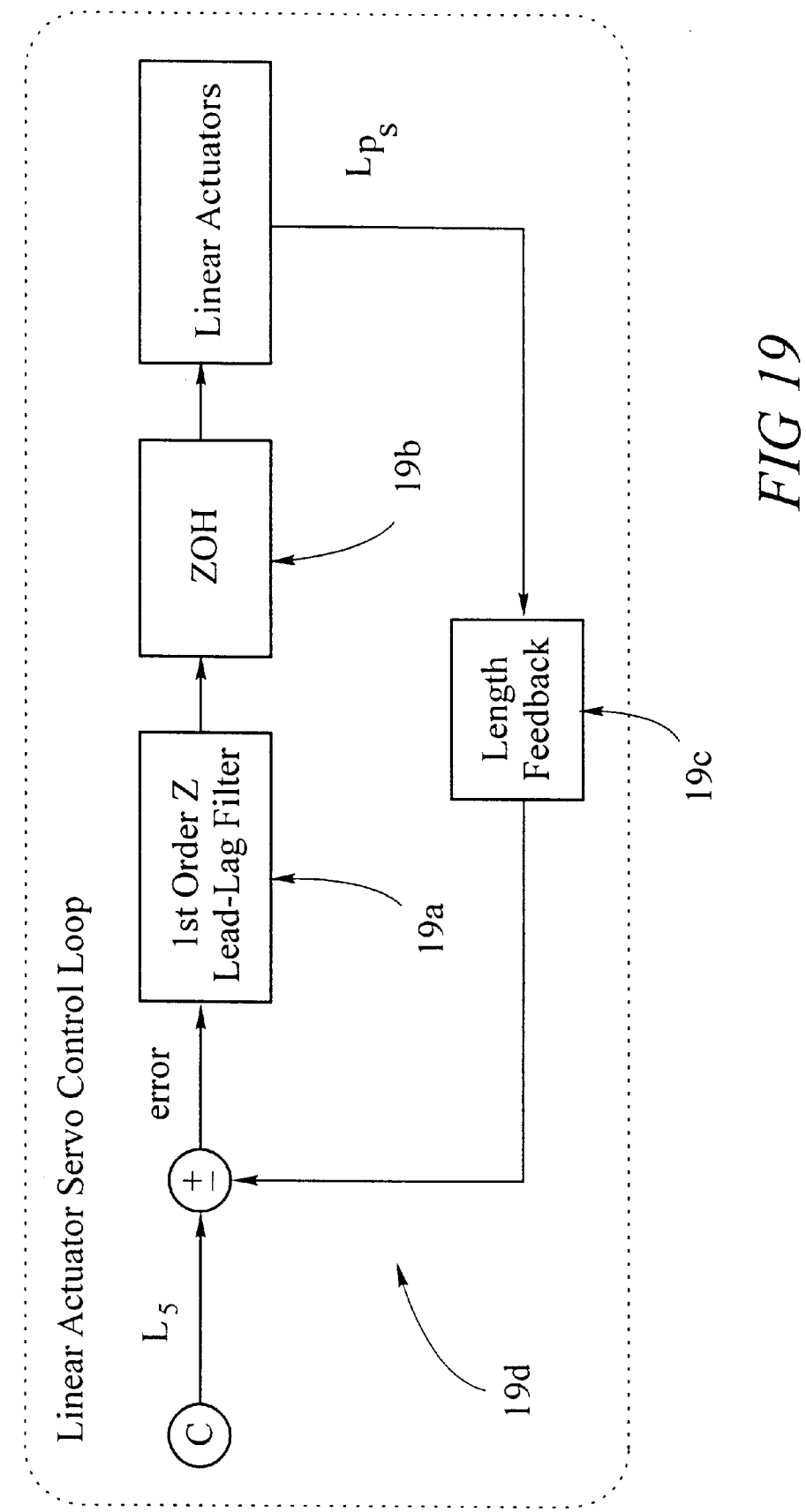
FIG. 19 is an expanded view of block 13d of FIG. 13.

Referring now to FIG. 19, having calculated $L_s$, closed loop control system 15 then dynamically adjusts each of the actuators 9 to its calculated $L_s$ through closed control loop 19e within closed loop control system 15. FIG. 19 is an exploded block diagram of the "Linear Actuator Servo Control Loop" block in FIG. 13. Preferably, loop 19 has an update rate, as shown by zero order hold 19b. Lag filter 19a can be modeled by difference Equation 30 above.

One of skill in the art can implement difference Equation 30 into a computer. Using the input of $L_s$ into closed loop 19d and using difference Equation 30, closed loop control system 15 dynamically adjusts each of the actuators 9 to achieve the desired global position $DP_{xyz}$ and the desired global angle $DA_{rpy}$ of load sensing ring 3. At each update interval, length feedback 19c is fed back through closed loop 19d. Length feedback 19c informs closed loop 19d of the present time length $L_{Ps}$ of each of the actuators 9. When the actual $L_{Ps}$ of an actuator 9 equals the desired $L_s$ for that actuator 9, the closed loop 19d holds the position of that actuator 9. Accordingly, when $L_{Ps}$ equals $L_s$ for each of the actuators 9, the closed loop 19d holds the load sensing ring 3 stationary.

The above discussion is meant to be illustrative of the principles of the present invention. Numerous variations and modifications will become apparent to those skilled in the art once the above disclosure is fully appreciated. It is intended that the following claims be interpreted to embrace all such variations and modifications.

What is claimed is:

1. A docking system for effecting a structural connection between a first object and a second object, said docking system comprising;

a first androgynous docking assembly rigidly attached to the first object, wherein the first androgynous docking assembly is configured as a passive component, and a second androgynous docking assembly rigidly attached to the second object, wherein the second androgynous docking assembly is structurally identical to the first androgynous docking assembly and is configured as an active component for structurally engaging the first androgynous docking assembly.

2. The docking system of claim 1 wherein the first androgynous docking assembly, configured as the passive component, is fixed and incapable, at least temporarily, of dynamically adjusting.

3. The docking system of claim 2, wherein the second, active, androgynous docking assembly comprises;

a load sensing ring, said load sensing ring further comprising,
a structural ring,
a soft capture ring having an outer face, and
a plurality of load cells positioned between said soft capture ring and said structural ring, said load cells producing electronic signals in response to, and representative of, the magnitude and direction of reaction forces imposed on said soft capture ring by contact of the second androgynous docking assembly with the first androgynous docking assembly.

4. The docking system of claim 3, wherein the second, active, androgynous docking assembly further comprises;

a closed loop control system capable of analyzing the electronic signals produced by said plurality of load cells and of outputting real time control signals, and a plurality of actuator arms for dynamically moving said soft capture ring into a desired position and orientation with respect to the second object in response to the real time control signals.

5. The docking system of claim 3 wherein the plurality of load cells are positioned at an angle of about 45 degrees relative to the outer face of the soft capture ring.

6. The docking system of claim 3 wherein each of the plurality of load cells is positioned as far from parallel as possible relative to each of the other load cells.

7. The docking system of claim 4, further comprising:

a plurality of motors, at least one motor coupled to each of said plurality of actuator arms, whereby said plurality of motors lengthen and shorten said plurality of actuator arms in response to said real time control signals to dynamically move said soft capture ring into a desired position and orientation.

8. The docking system of claim 1 further comprising at least one contact sensor coupled to said load sensing ring, to detect physical contact of said second androgynous docking assembly with said first androgynous docking assembly.

9. The docking system of claim 4 wherein said closed loop control system of the second active docking assembly is adjustable, said adjustable closed loop control system capable of being varied to match the physical properties of a particular first object to be mated, said physical properties comprising one or more of the first object's mass and center of gravity offset.

10. The docking system of claim 4 wherein said closed loop control system of the second active docking assembly is adjustable, said adjustable closed loop control system capable of being varied to match the relative dynamic properties of a particular first object to be mated, said relative dynamic properties comprising one or more of the first object's approach velocity, and angular rate relative to the second object.

11. The docking system of claim 10 whereby a structural connection between said first and second objects may be effected whether the first object's approach velocity relative the second object is positive in magnitude, negative in magnitude, or zero.

12. The docking system of claim 4 wherein said closed loop control system of the second, active docking assembly is tunable in each axis, said tunable closed loop control system being capable of varying one or more stiffness and damping constants to satisfy desired stiffness, capture, and mass handling docking requirements.

13. The docking system of claim 3, wherein said second androgynous docking assembly further comprises:
   one or more electromagnets positioned on the outer face of said soft docking ring capable of mating with one or more striker plates on said first androgynous docking assembly, and
   one or more striker plates positioned on the outer face of said soft docking ring.

14. A fully androgynous docking system, comprising:
   a first docking assembly capable of mating with a second docking assembly;
   a second docking assembly structurally identical to said first docking assembly, said first docking assembly comprising;
   a load sensing ring;
   a plurality of load cells coupled to said load sensing ring, each of said plurality of load cells being capable of sensing forces imposed on said load sensing ring by contact with said second docking assembly and generating electronic signals representative of the sensed forces;
   a plurality of actuator arms coupled to said load sensing ring capable of physically and dynamically moving said load sensing ring through six degrees of freedom; and
   a closed loop control system coupled to said load cells and capable of analyzing the signals originating from said plurality of load cells and of generating real time control signals whereby said plurality of actuator arms move said load sensing ring through six degrees of freedom.

15. The docking system of claim 14 wherein said plurality of actuator arms are lengthened and shortened by a plurality of motors in response to said real time control signals from said closed loop control system to move said load sensing ring through six degrees of freedom.

16. The docking system of claim 14 wherein said load sensing ring of said second docking assembly further comprises:

a soft capture ring having an outer face;
one or more electromagnets positioned on the outer face capable of mating with one or more striker plates on said first docking assembly, and
one or more striker plates positioned on the outer face of said soft capture ring.

17. A docking system for effecting a structural connection between a first object and a second object, said docking system comprising;
   a first androgynous docking assembly rigidly attached to said first object;
   a second androgynous docking assembly rigidly attached to said second object,
   said first and second androgynous docking assemblies being structurally identical, whereby,
   a structural connection may be effected between the first object and the second object upon contact of the first docking assembly with the second docking assembly.

18. The docking system of claim 17 wherein the structural connection between said first and second objects may be effected whether the relative motion between said first and second objects is positive in magnitude, negative in magnitude, or zero.

19. A method of docking a first and second objects, said first object having a first androgynous docking assembly and said second object having a second, identical, androgynous docking assembly, comprising the steps:
   a. extending a portion of first docking assembly into contact with second androgynous docking assembly;
   b. sensing a plurality of forces imposed on first docking assembly by contact with second androgynous docking assembly;
   c. assessing the magnitude of each of the plurality of imposed forces;
   d. determining, from the magnitude of the plurality of imposed forces, the relative position and angular orientation of the first object with respect to the second object;
   e. computing dynamic control signals required to effect a desired relative position and angular orientation of the first object with respect to the second object; and
   f. applying, in response to the dynamic control signals, forces on the second object to move the first object into desired relative position and angular orientation.

20. The method of claim 19 whereby the step of applying forces on the second object comprises the further steps of
   counteracting and absorbing forces imposed on the first object by the second object, and
   attenuating residual forces between first and second objects to bring them into the desired relative position and orientation.

21. The method of claim 20 further comprising the step of attaching the first object to the second object by activating electromagnetic devices on the first androgynous docking assembly.

22. The method of claim 20 further comprising the step of attaching the first object to the second object by activating electromagnetic devices on the second androgynous docking assembly.

* * * * *